United States Patent [19]

Rozier

[11] Patent Number: 5,357,068

[45] Date of Patent: Oct. 18, 1994

[54] SULFUR HEXAFLUORIDE ISOLATING CIRCUIT-BREAKER AND USE THEREOF IN PREFABRICATED STATIONS, SUBSTATIONS, AND BAYS

[75] Inventor: Paul Rozier, Chalon Sur Saone, France

[73] Assignee: GEC Alsthom SA, Paris, France

[21] Appl. No.: 977,791

[22] Filed: Nov. 17, 1992

[30] Foreign Application Priority Data

Nov. 20, 1991 [FR] France .................. 91 14313

[51] Int. Cl.$^5$ .................. H01H 33/52; H01H 33/48
[52] U.S. Cl. .................. 200/148 R; 200/50 AA; 200/148 F
[58] Field of Search ............ 200/144 R, 144 B, 145, 200/148 R, 148 D, 148 F, 150 J, 150 JA, 150 L, 50 R, 50 A, 50 AA; 361/334–339, 341–343, 345, 355, 376, 390–391, 430–432

[56] References Cited

U.S. PATENT DOCUMENTS

| | | | |
|---|---|---|---|
| 2,492,490 | 12/1949 | Lindae | 200/50 |
| 2,952,799 | 9/1960 | Wortman et al. | 317/103 |
| 4,038,585 | 7/1977 | Wolski et al. | 361/334 |
| 4,110,578 | 8/1978 | Freeman et al. | 200/148 F |
| 4,521,657 | 6/1985 | Thuries | 200/148 R |

*Primary Examiner*—A. D. Pellinen
*Assistant Examiner*—Michael A. Friedhofer
*Attorney, Agent, or Firm*—Sughrue, Mion, Zinn, Macpeak & Seas

[57] ABSTRACT

A sulfur hexafluoride isolating circuit-breaker comprises an SF$_6$-filled gastight case for each cell containing fixed contacts and arcing contacts, the poles are fixed to a common grounded metal bar capable of pivoting between two end walls of a drawer suitable for containing the poles, said bar shelters a control shaft for the poles and connected to a control box which is itself connected to said bar, the rotation of the bar providing the section-switch isolating function and rotating or translating said shaft driving the circuit breaking function.

9 Claims, 20 Drawing Sheets

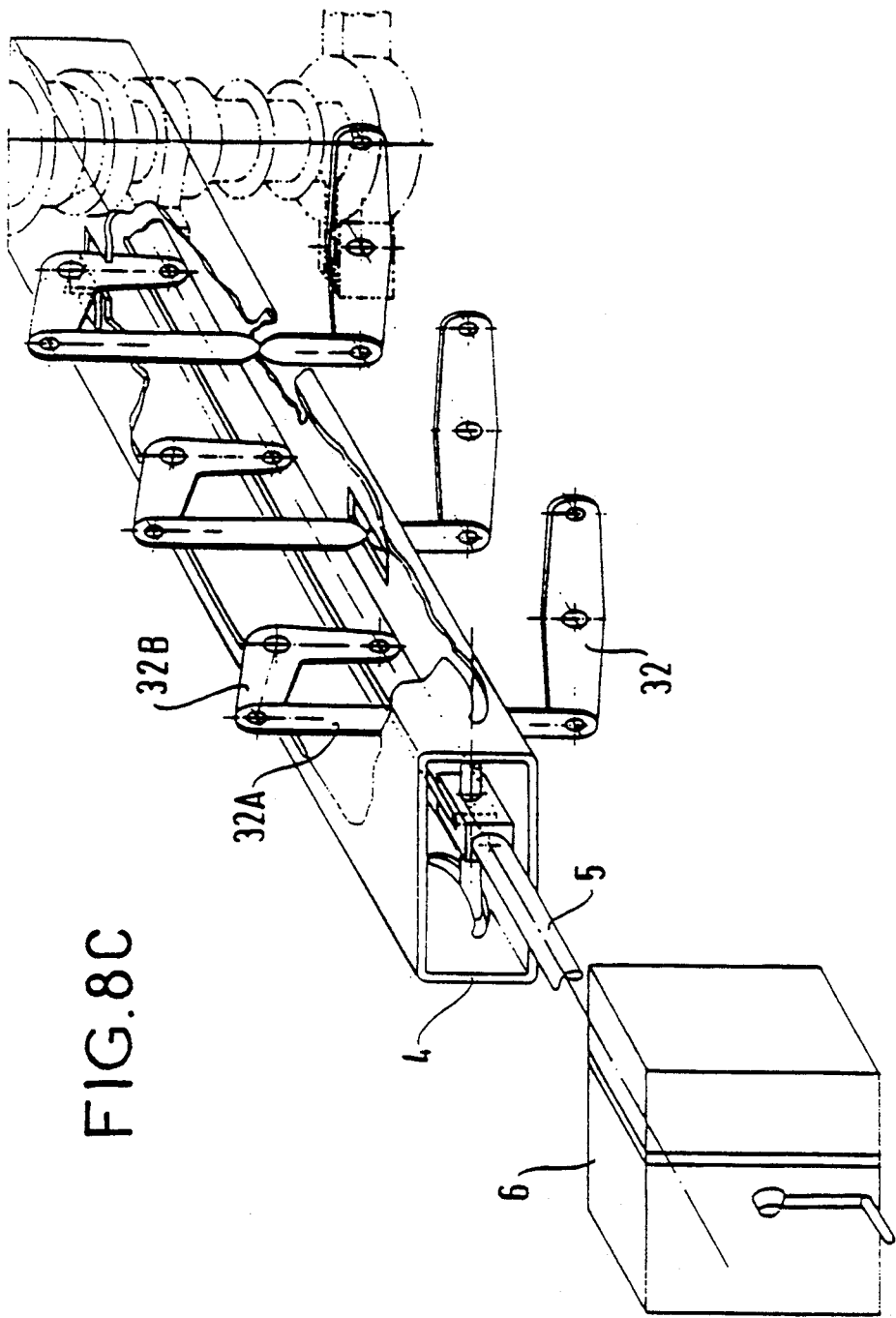

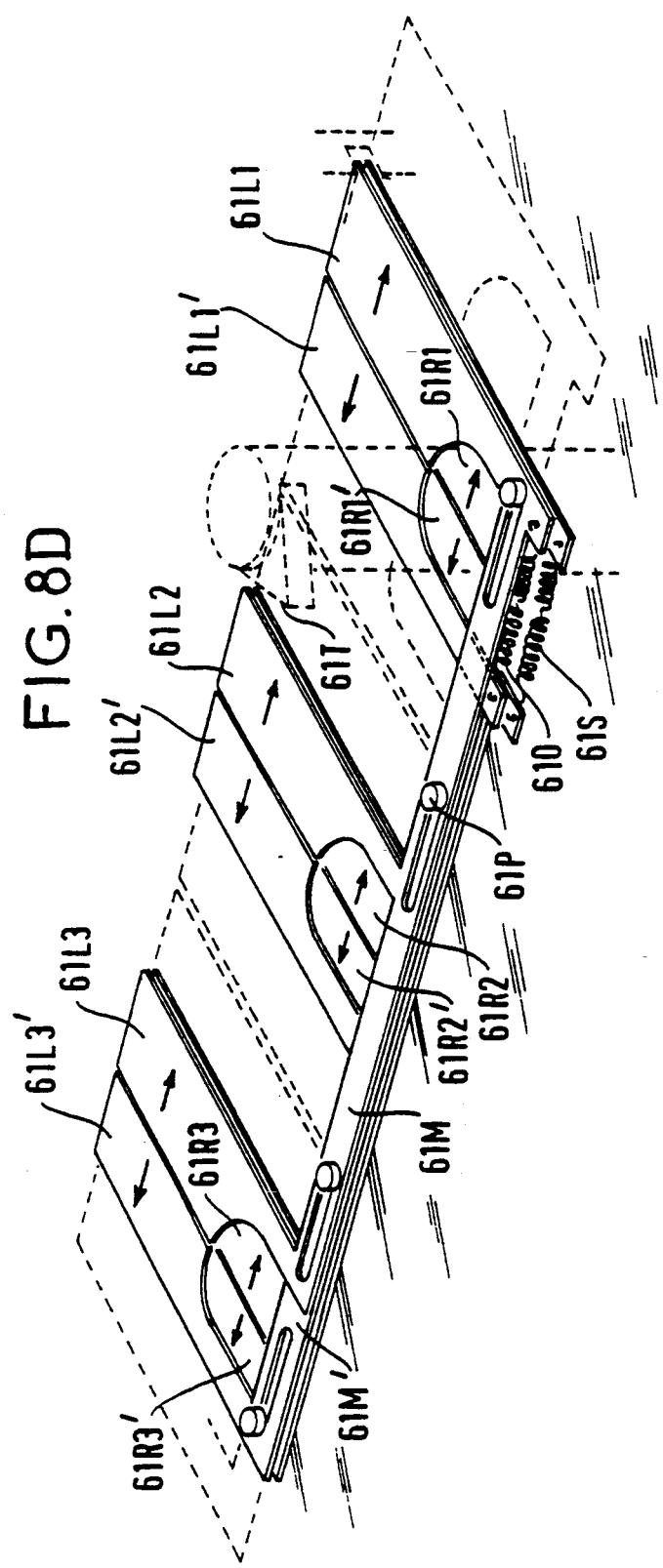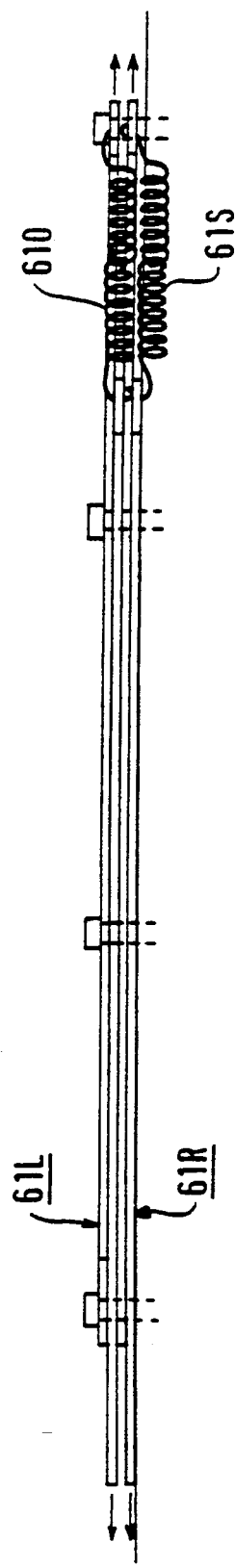

SULFUR HEXAFLUORIDE ISOLATING CIRCUIT-BREAKER AND USE THEREOF IN PREFABRICATED STATIONS, SUBSTATIONS, AND BAYS

The present invention relates to a medium-tenion and high-tension sulfur hexafluoride ($SF_6$) isolating circuit-breaker, and various uses for such an apparatus, in particular in prefabricated stations, substations, and bays. The invention applies to all types of $SF_6$ circuit-breaker (buffer type, thermal blasting type, rotary arc type, or a combination of those various types ). The invention is applicable to apparatuses for all voltages in the range 3 kV to 72 kV.

The term "isolating circuit-breaker" is used for an electrical apparatus having interrupting power like a circuit-breaker and which, when in the isolating position, is capable of presenting dielectric strength between its inlet and outlet terminals equal to or greater to that required of section switches.

BACKGROUND OF THE INVENTION

Such an apparatus is therefore capable of replacing three apparatuses, namely: a circuit-breaker, and an upstream section switch and a downstream section switch associated therewith. This is particularly advantageous for an operator both because of the saving achieved in investment (lower costs, lower ground area requirement) and because of savings in maintenance while the apparatus is in operation.

The principle of such apparatus has been described in French patent No. 1 533 266, but no industrial implementation has been described in detail.

Progress achieved in the field of current interruption using sulfur hexafluoride ($SF_6$) now makes it possible to envisage implementing such apparatus industrially, thereby making it possible:

to reduce the bulk of the apparatus;
to reduce the energy required by its control box; and
to reduce the cost price thereof.

An object of the present invention is thus to define a sulfur hexafluoride isolating circuit-breaker of the above-specified type which is compact in structure and which can easily be used in implementing a prefabricated substation.

Another object of the invention is to define a substation that is cheaper than substations of known type.

Another object of the invention is to provide an isolating circuit-breaker suitable for remote control both of its section switch function and of its circuit-breaker function.

Another object of the invention is to provide an isolating circuit-breaker that includes protection without using an auxiliary energy source.

The prior art is also illustrated by German petty patent number 1 870 065 which discloses a circuit-breaker whose poles are disposed on a horizontal bar capable of pivoting about its axis and of providing a section-isolating function for the circuit-breaker. When the circuit-breaker is in its isolating position, its poles are inclined, thereby reducing its isolation distance, and thus requiring the apparatus to be overdimensioned in order to obtain dielectric strength.

Another drawback of that device is that in its isolating position, its poles are at a potential that is not determined (floating potential).

Another drawback of the circuit-breaker described in the above-mentioned document is the need to use an insulating plate to insulate the front face of the apparatus when the circuit breaker is extracted.

Another drawback is that in the event of excess voltage between a set of busbars and cables, the gap between said elements maybe bridged by an arc.

Another drawback is that the poles of the circuit-breaker are necessarily controlled by rotary means and cannot be controlled by a push-pull action.

Another drawback is that the poles must be provided with connectors for making connection with the busbars or with the cables, and this excludes any direct engagement.

An object of the invention is to provide an isolating circuit-breaker that avoids the above-mentioned drawbacks.

SUMMARY OF THE INVENTION

The present invention provides a multipole sulfur hexafluoride isolating circuit-breaker of any technology in which each pole comprises an insulating case filled with sulfur hexafluoride and provided with first and second metal end-plates, the case containing a set of fixed contacts connected to a first jaw terminal outside the case and mechanically and electrically connected to the first endplate, a set of moving contacts electrically connected to a second jaw terminal outside the case, secured to the second endplate, and mechanically connected to a drive mechanism, wherein for each pole, the moving contacts are electrically connected via sliding contacts to a fixed metal tube extending inside the case and coaxial therewith, the tube opening out into a sealed casing, said second jaw terminal being secured to the casing, said moving contacts being connected to a drive rod disposed inside said tube and hinged inside the casing to a first end of mechanical transmission means passing through the casing in sealed manner and having a second end outside the casing hinged to a first end of an insulating rod whose other end is hinged via a crank to a control shaft which is common to the various poles of the isolating circuit-breaker, the control shaft being disposed parallel to a metal bar at ground potential having the poles of the isolating circuit-breaker fixed thereto, the poles being fixed substantially in the middles of their respective cases, the various cases being disposed in parallel perpendicularly to said bar, the ends of said bar being pivotally mounted to two opposite faces of a substantially rectangular drawer, the section switching function of the isolating circuit-breaker being provided by rotating said bar through 90° relative to the drawer, the drawer being large enough to contain the set of poles, the control shaft being associated with a control box containing a mechanism for storing drive energy and means for driving said control shaft in rotation or in translation in order to cause all of the poles to perform their circuit-breaker function simultaneously.

Advantageously, the case is surrounded by a wound magnetic torus constituting a current transformer, the torus being disposed above said angle bar.

The invention also provides a prefabricated substation comprising at least one isolating circuit-breaker of the above-specified type.

Preferably, the substation is made up of juxtaposed prefabricated modules each including a compartment for the sets of busbars, slideways for receiving a drawer containing the poles of an isolating circuit-breaker, and a compartment containing a set of cables or of overhead inlets.

BRIEF DESCRIPTION OF THE DRAWINGS

Embodiments of the invention are described by way of example with reference to the accompanying drawings, in which:

FIG. 8C is a perspective view of the translation drive mechanism for poles of the isolating circuit-breaker of the invention;

FIG. 8D is a perspective view of a variant embodiment of the flaps for isolating the two portions of a bay;

FIG. 8E is a side view of the flaps shown in FIG. 8D;

In FIG. 1, references 1, 2, and 3 designate the three poles of an SF$_6$ three-phase isolating circuit-breaker of the invention.

DETAILED DESCRIPTION

Figure 1:
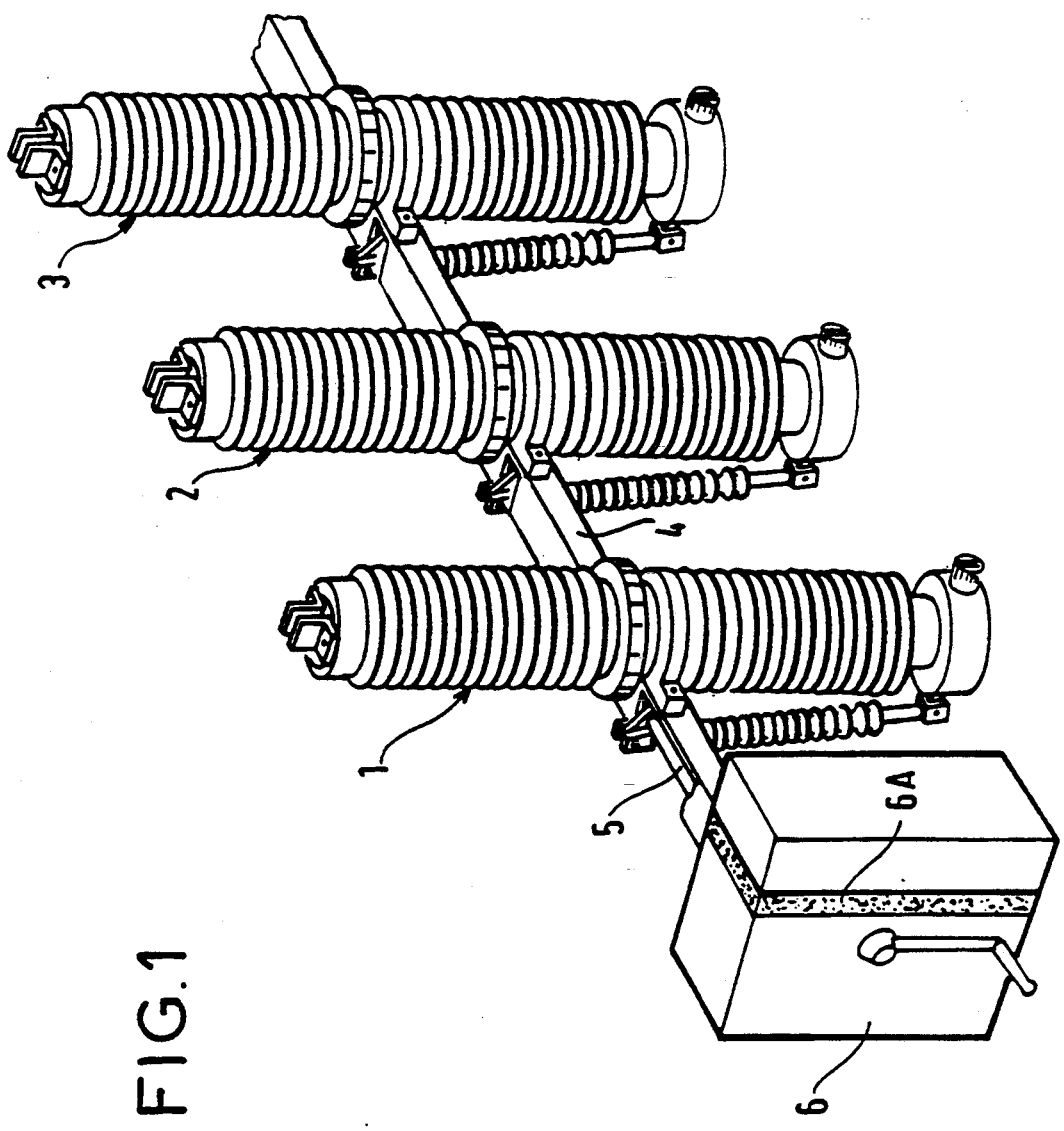
FIG. 1 is a perspective view of an SF$_6$ isolating circuit-breaker of the invention in which the drawer is not shown.

As can be seen in the drawing, the three poles are carried by a metal bar 4 which is preferably an angle bar, having a control shaft 5 fixed thereto for driving the circuit breaking function of the apparatus. The control shaft is connected to a drive mechanism contained in a control box 6. As described in detail below, the section switch function of the apparatus is provided by rotating the bar 4 through 90° about an edge thereof. The metal bar may have a plastic angle section bar fixed thereto (not shown) e.g. by snap-fastening, thereby making up a hollow beam that protects the shaft 5 from dust and pollution.

The poles are controlled for their circuit-breaking function by the shaft 5 which may be driven with rotary motion or with translation motion (push-pull). When the shaft 5 is driven with rotary motion, the control box 6 is advantageously secured to the bar 4. When it is driven with push-pull motion, the control box 6 is either secured to the bar 4, or else, and preferably, it is stationary.

Figure 2:
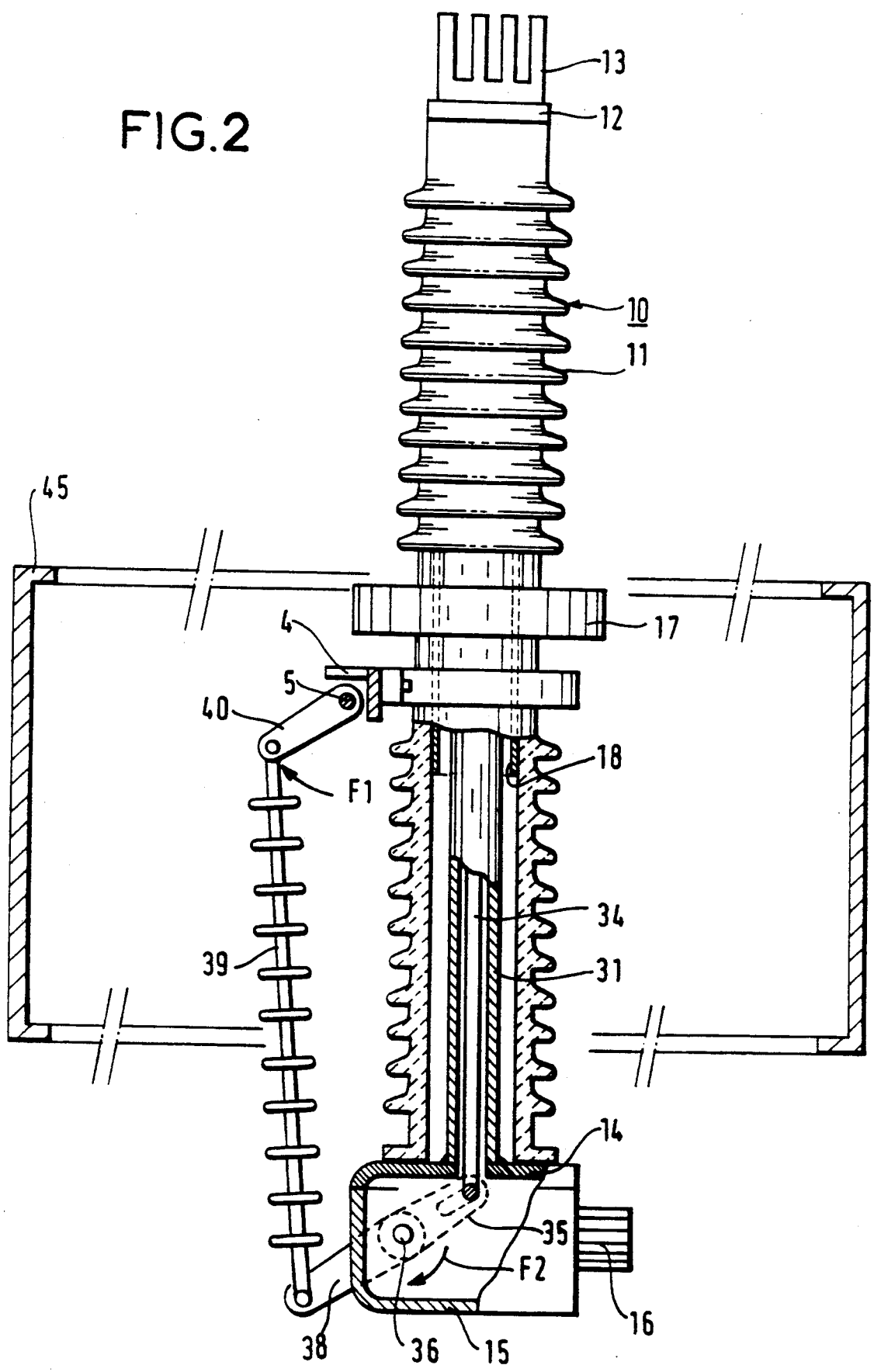
FIG. 2 is an elevation view in axial section through one pole of an SF$_6$ isolating-circuit-breaker of the invention.
Figure 3:
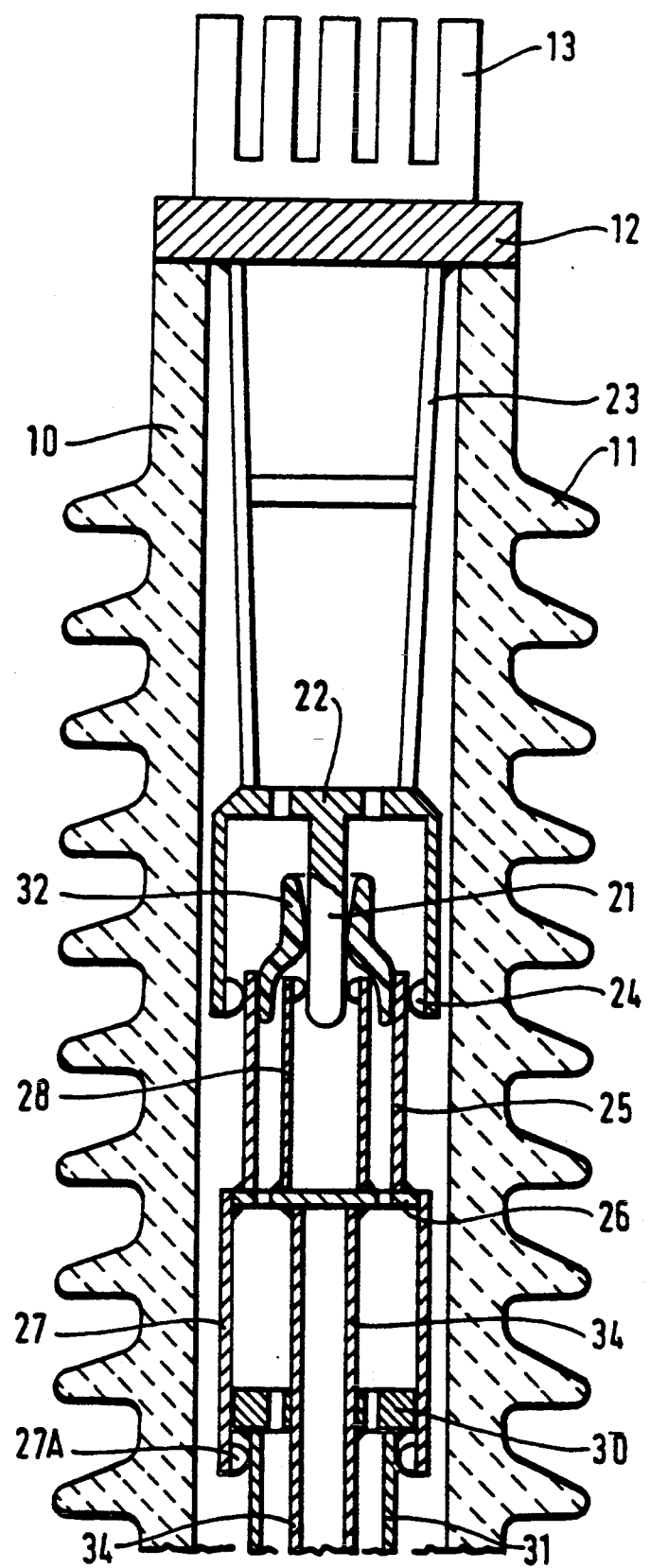
FIG. 3 is an enlarged view in elevation and in axial section through the interrupting chamber portion of the pole shown in FIG. 2.

On observing FIGS. 2 and 3, it can be seen that a pole of the isolating circuit-breaker of the invention comprises a case 10 made of an insulating material such as ceramic, epoxy resin, or any other composite material that is compatible with the use of sulfur hexafluoride SF$_6$. The case is provided with fins 11 that are either integrally molded therewith (in epoxy, silicone, or elastomer), or that are added thereto. The case is closed at a first end by a first metal endplate 12 carrying a first metal jaw terminal 13. The case is closed at a second end by a second metal endplate 14 having a sealed casing 15 carrying a second jaw terminal 16.

The central portion of the case lacks fins firstly to allow the pole to be fixed to the angle bar 4, and secondly to allow a wound toroidal magnetic circuit 17 to be installed to constitute a current transformer that feeds a protection relay, which relay is thus capable of operating without an auxiliary source of electricity. When the fins on the case are of the add-on type, then the torus is closed and is installed by being slid over the cylindrical case before the fins are installed. Otherwise, when the fins are integrally molded or formed with the case, an open type torus is used.

The torus is secured level with the angle bar and is prevented from moving.

The inside of the case is filled with gas having good dielectric properties, and it is preferable to use sulfur hexafluoride having the formula SF$_6$, either pure or mixed with nitrogen, and at a pressure of a few hectopascals.

One half of the case contains the interrupting chamber of the apparatus. FIG. 3 shows a gas blast interrupting chamber, but the invention naturally applies to any type of interrupting chamber and in particular to puffer type interrupting chambers, to chambers in which an arc is blasted by the production of heat energy, and interrupting chambers that make use of a rotating arc.

In FIG. 3, reference 21 designates a fixed arcing contact secured to a ring 22 fixed to the endplate 12 by metal arms 23. The ring 22 also carries contact fingers 24 that constitute a permanent fixed contact in the apparatus.

The fingers 24 co-operate with a metal tube 25 that constitutes the permanent moving contact of the apparatus. This tube is fixed to a plate 26 that carries a blast cylinder 27. The metal plate 26 also carries a ring of contact fingers 28 that constitute the moving arcing contact of the apparatus and that co-operate with the fixed arcing contact 21.

The blast cylinder 27 contains a fixed blast piston 30 which is fixed to a first end of a metal tube 31 which extends along the case and which has a second end welded to the second endplate 14.

The tube 25 carries a blast nozzle 32 made of insulating material.

The plate 26 has a metal tube 34 fixed thereto, which tube constitutes a drive rod for the circuit-breaker portion of the apparatus. The tube 34 is disposed inside the tube 31 and coaxially therewith. It passes through the plate 14 and penetrates inside the casing 15 where it is hinged to a first crank 35 that pivots with a pin 36 passing through the casing in sealed manner and extending to the outside thereof.

The tube 27 is provided with sliding contacts 27A that allow current to pass between the tube 27 and the tube 31.

A second crank 38 pivots with the pin 36, but outside the casing 15. This crank is in turn hinged to a first end of an insulating rod 39 whose other end is hinged to a crank 40 which is secured to the control shaft 5 of the apparatus.

The circuit-breaker portion of the apparatus operates as follows.

When the circuit-breaker is in the closed position, each of its poles is in the configuration shown in FIG. 3. Current flows successively through the jaw terminal 13, the first endplate 12, the arm 23, the contacts 24, the tube 25, the cylinder 27, the fingers 27A, the tube 31, the second endplate 14, the casing 15, and the second jaw terminal 16.

To open the circuit-breaker, the shaft 5 is rotated in the direction of arrow F1. The crank 40 rotates, thereby driving the insulating rod 39 which pivots the pin 36 in the direction of arrow F2. Rotation of the crank 35 causes the drive tube 34 to move down in the figure. The moving contacts are driven and move away from the stationary contacts. The arc is blasted by the gas compressed in the cylinder 34 and that escapes through the blast nozzle 32.

It may be observed that the plates 22 and 26, the piston 30, and the endplate 14 all have holes or apertures enabling gas to flow freely and enabling it to regenerate quickly after each opening operation.

A metal screen 18 disposed inside the case 10 level with the toroidal coil 17 and the angle bar 4 provides good distribution of potential.

This feature contributes to dielectric strength that is also provided by the thickness of the layer of $SF_6$ gas under pressure at this level, by capacitive distribution of the potential gradient inside the case, and by metal coating on the outside of the case. This potential distribution is advantageously established and designed by means of well known mathematical models.

Figure 4:
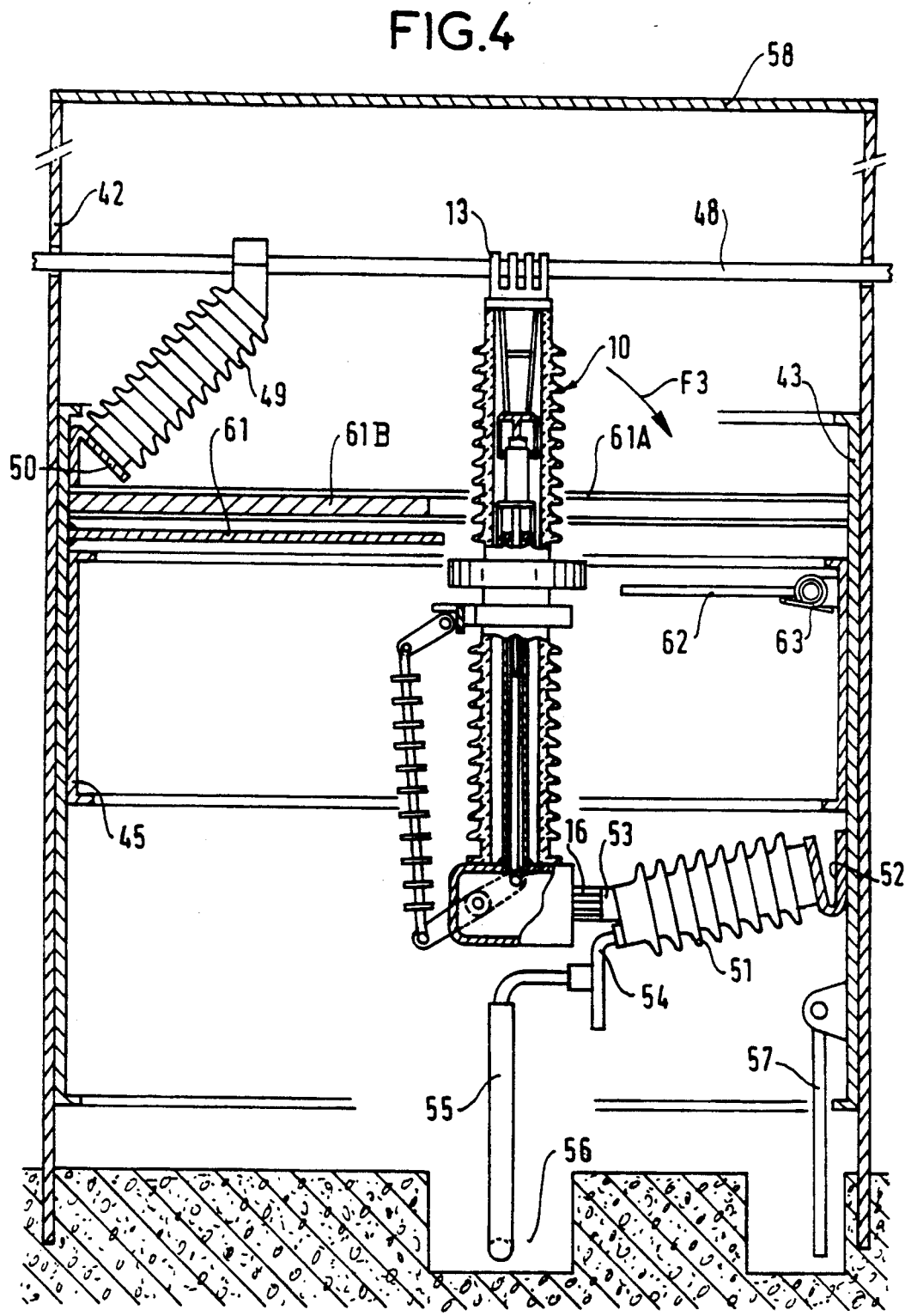
FIG. 4 is an elevation view partially in section showing an SF$_6$ isolating circuit-breaker of the invention placed in a chest, together with its connections to a set of busbars and to a set of cable outlets, the figure showing the circuit-breaker and the section switch in the closed position.

According to a very important characteristic of the invention, the ends of the bar 4 are pivotally mounted on two opposite faces of a drawer. Reference can be made to FIG. 4 which shows the isolating circuit-breaker of the invention mounted in a bay.

Only one of the poles of the apparatus is visible in the figure since the figure is an end-on view, however it should not be forgotten that a three-phase apparatus includes two other poles that are also secured to the bar 4.

In FIG. 4, the bay comprises a metal structure or frame 42 to which a chest 43 is secured. A drawer 45 is mounted to slide perpendicularly to the plane of the figure relative to the chest, and the bar 4 supporting the poles is mounted to pivot between two opposite faces of the drawer that are parallel to the plane of the figure. The apparatus shown with its circuit-breaker closed and with its section switch closed. In the description below, reference is made to items that relate to a single pole, however it should naturally be understood that most of the items described exist for each of the three poles in a three-phase isolating circuit-breaker. The pole 1 is electrically connected by means of its jaw terminal 13 to a busbar 48 in a three phase set of busbars. The busbar 48 is held in place by an insulator 49 which is held in a fixed position by a bracket 50 fixed to the chest 43. The other jaw terminal 16 of the apparatus is connected to an insulator 51 fixed to the chest 43 by a bracket 52. In the example of FIG. 4, the selected insulator is a current transformer carrying the current that passes through the isolating circuit-breaker which flows between a terminal 53 and a terminal 54. In a variant, the apparatus 51 could be a lightning arrester or merely an insulator having no other electrical function. The terminal 54 constitutes a cable outlet 55 that leaves the bay via a trench 56. The bay also has a grounding section switch 57 and a roof 58.

Figure 5:
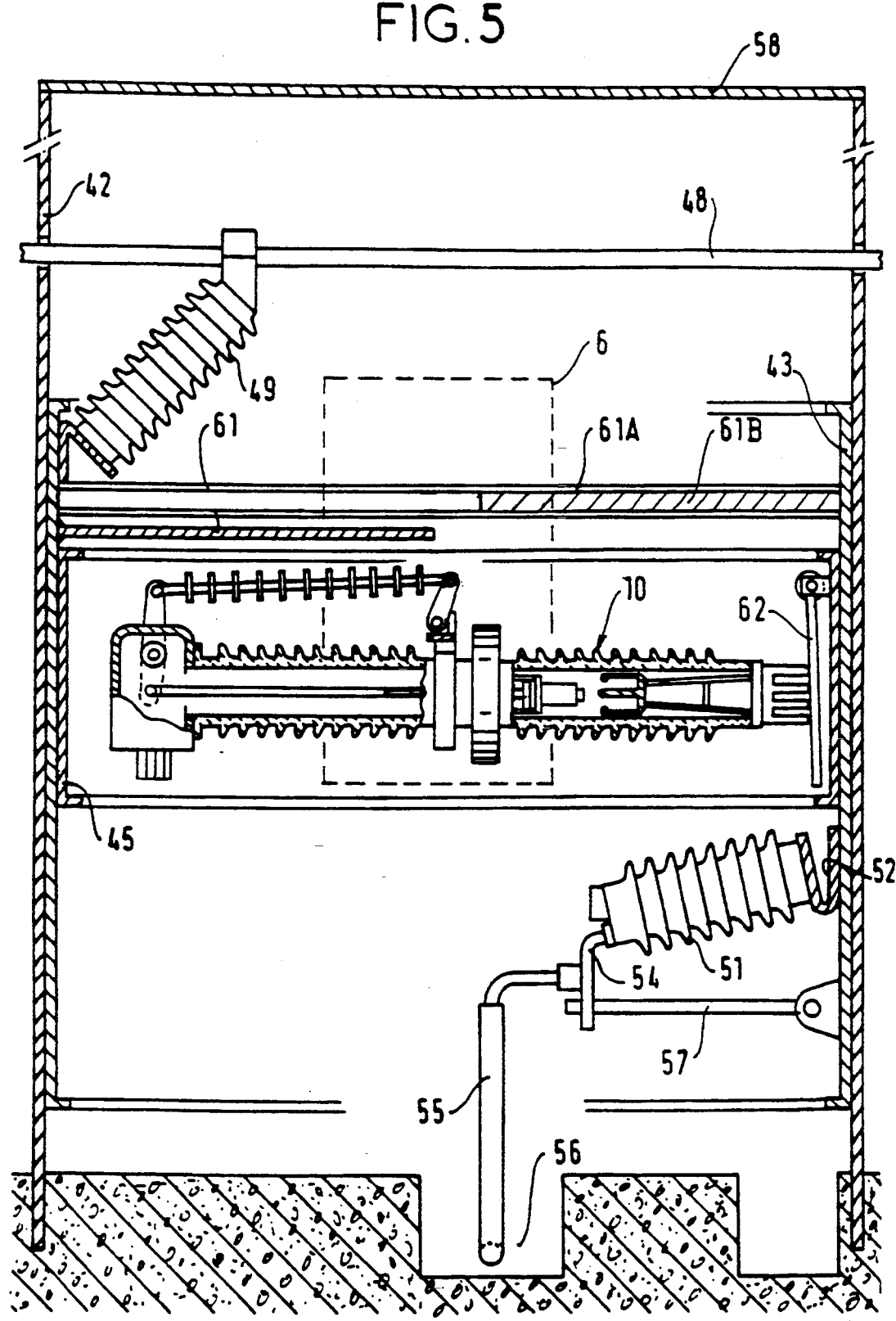
FIG. 5 is an elevation view partially in section through the same isolating circuit-breaker but with the circuit-breaker shown open and with section switch isolation achieved.

The isolating circuit-breaker of the invention performs its section switching function as follows:
 the circuit-breaker is triggered by acting on the control shaft 5 as described above; and
 the entire apparatus is then tilted in the direction of arrow F3 under manual or motor-driven control. The configuration of FIG. 5 is then obtained with all of the poles of the isolating circuit-breaker being located in the drawer 45. In the example described, it can be seen that the control box 6 pivots together with the angle bar 4. This disposition ensures that section switching is visible, thereby increasing safety for operating personnel. An indicator 6A carried by the control box 6 e.g. a stripe of paint, further increases this safety aspect. In a variant, the box is stationary, and this is particularly easily done when the poles are under push-pull type control.

A known device (but not shown) enables total extraction of the drawer to be prevented, thereby preventing access to parts in the busbar compartment of the bay. Means described below completely prevent access to the busbars when the drawer is in its open position.

Figure 6:
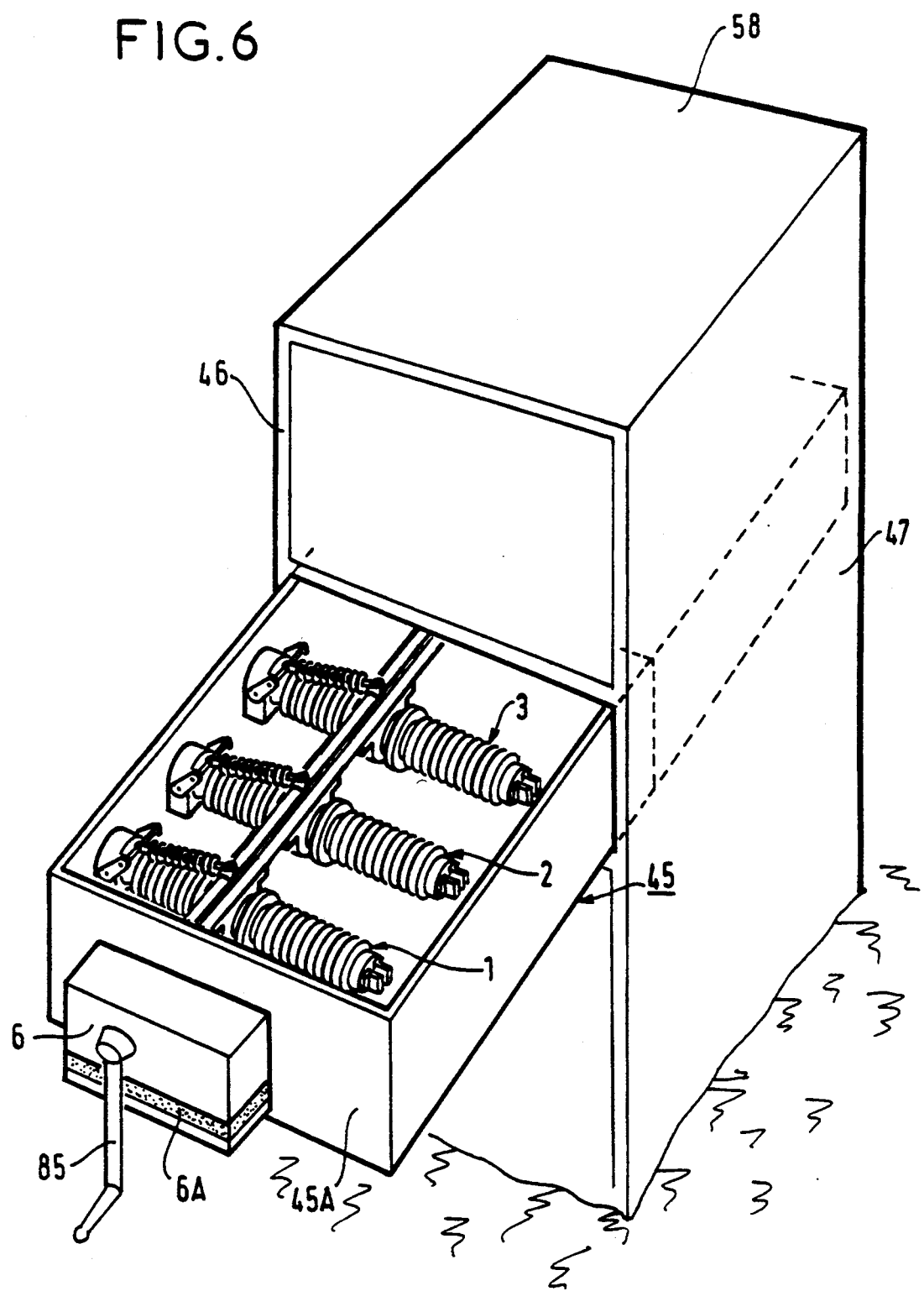
FIG. 6 is a perspective view of a bay containing an isolating circuit-breaker of the invention, the bay being shown with its drawer open.

FIG. 6 shows a drawer that has been pulled open, enabling the poles to be examined or replaced. It may be observed that the disposition of the poles ensures that the drawer can be re-closed only in the section switch open position. Finally, it should be observed that when the drawer is open, the poles of the isolating circuit-breaker can be replaced to the vertical position by rotating the angle bar 4, e.g. to perform engagement and disagreement tests, or to remove a pole.

The chest includes a stationary first flap 61 which in normal operation separates the lefthand portion of the busbar compartment from the lefthand portion of the cable compartment.

The chest also carries two slideways 61A in which a moving second flap 61B can slide. In the normal operation position of the isolating circuit-breaker, the flap 61B lies above the flap 61 (FIG. 4). When the isolating circuit-breaker is in its isolating position, the flap 61B takes up a position to the right in the figure such that all access to the busbar compartment from the front face of the bay is prevented.

The drawer is fitted with a pivoting automatic shutter flap 62 which is urged into position by a return spring 63. This flap separates the righthand portion of the busbar compartment from the cable compartment when the isolating circuit-breaker is in normal operation. When a section switching operation is being performed, it serves to put the apparatus to ground potential by coming into contact with and remaining in contact with the jaw terminal 13 (FIG. 5).

It maybe observed that the metal bar 4 connected to the control box 6 is at ground potential. Since the poles of the isolating circuit-breaker are all mounted on this bar, the risk of arcing between phases is practically non-existent.

Current sensors 17 on the poles serve to detect an abnormal overload or short-circuit current flowing through the poles, and thus to cause the circuit-breaker to be opened. The direct action maximum current relay (which does not require an auxiliary energy source) maybe placed in the control box 6. In the event of the case of a pole breaking down level with the metal bar, then the current detector will detect the grounding fault and will trigger disengagement.

Figure 7:
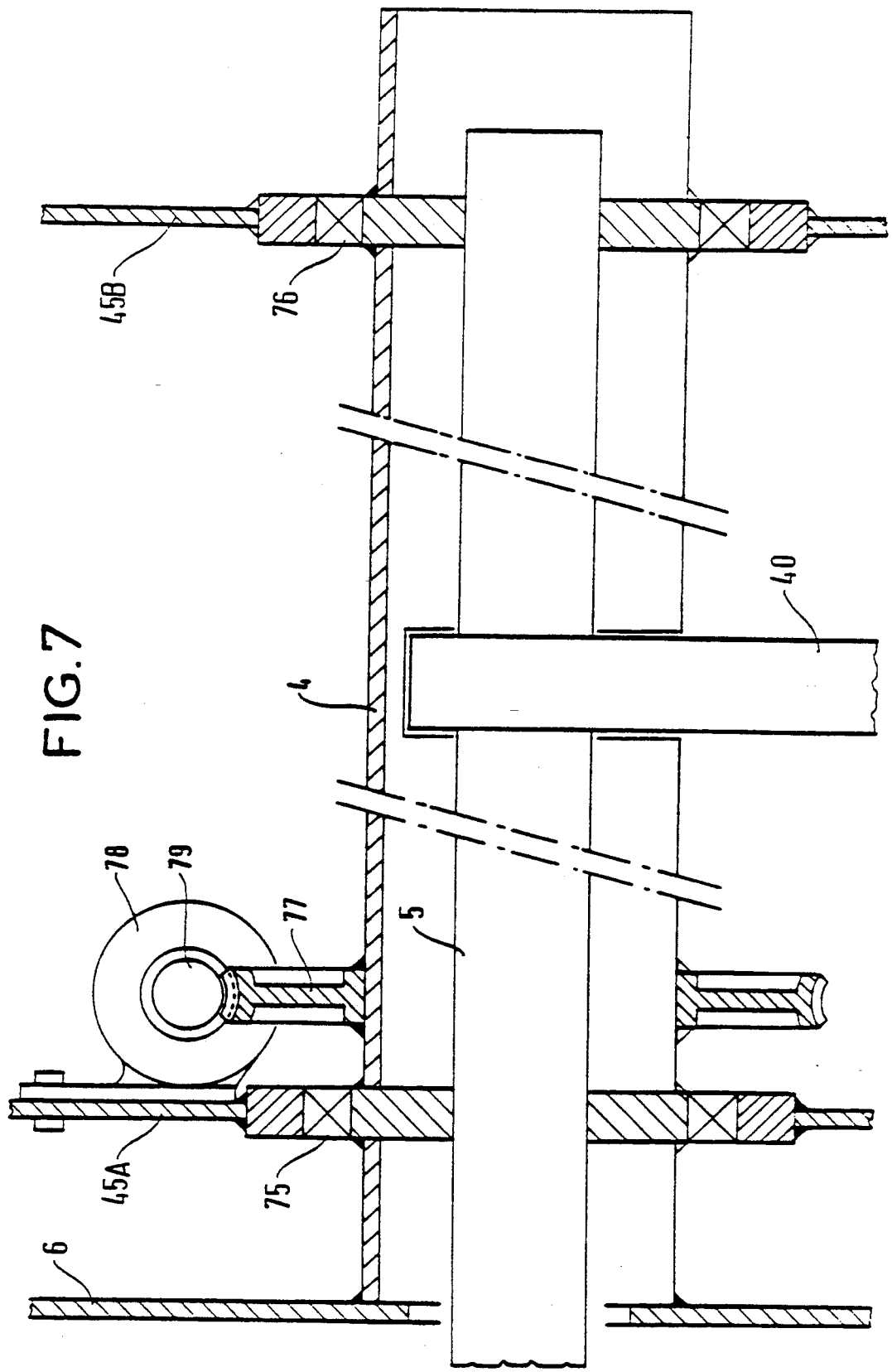
FIG. 7 shows the drive mechanism for the section switch function of the isolating circuit-breaker of the invention.

FIG. 7 shows how the section switch function of the isolating circuit-breaker of the invention is motorized.

In the figure, there can be seen the metal bar 4 and the control shaft 5 for the poles together with one of the cranks 40. The corresponding pole is not shown in order to clarify the drawing.

The bar 4 is held by two ball bearings 75 and 76 secured respectively to walls 45A and 45B of the drawer 45. The control box 6 is secured to the angle bar 4, e.g. by welding. A motor 78 is fixed to the wall 45A of the drawer, which motor drives the gear wheel 77 secured to the bar 4 via a helical screw 79, thereby providing speed reduction, such drive causing the bar 4 and the box 6 to rotate independently of the rotary motion of the control shaft 5. Motorizing the section switch operation as described above shows that the apparatus is suitable for remote control, and that it can thus be fitted to substations that do not normally have operating or maintenance personnel.

Figure 8:
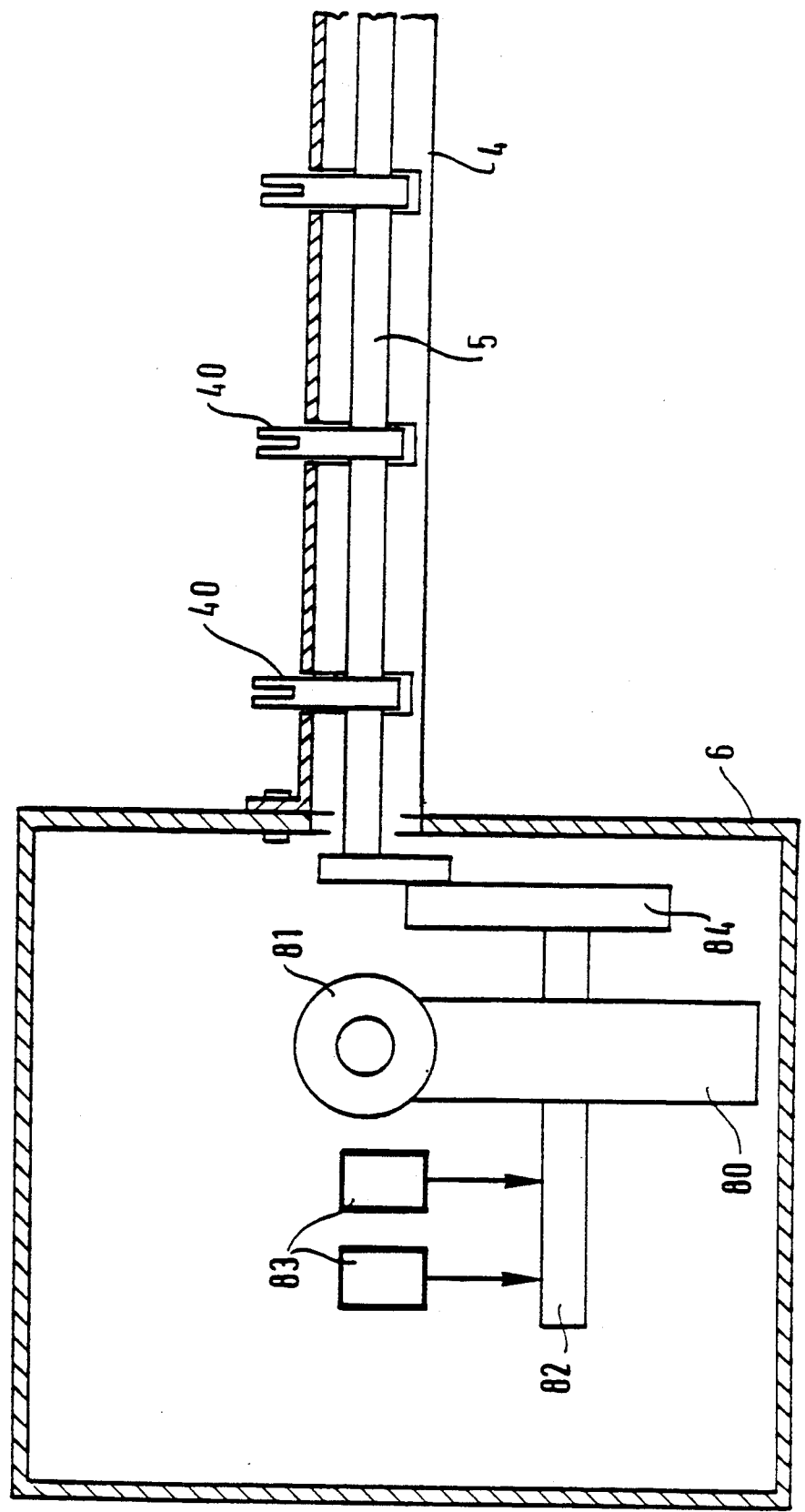
FIG. 8 shows the drive mechanism for the interrupting function of the isolating circuit-breaker of the invention.

In addition to the above-mentioned maximum current relay, the box 6 contains the entire mechanism for rotating the control shaft 5 and suitable for performing opening and closing cycles in the circuit-breaker portion of the isolating circuit-breaker of the invention. FIG. 8 is a diagram showing the principles of this mechanism which has the advantage of being connected directly to the control shaft 5 of the isolating circuit-breaker. It suffices to explain the principles of the mechanism, its implementation is within the competence of the person skilled in the art who may usefully refer to the article by Eugene Maury, entitled "Appareillage electrique d'interruption a haute tension" published in Techniques d'Ingenieur, D 657-4, page 49.

In FIG. 8, there can be seen the shaft 5 running along the angle bar 4 which is secured in this example to the control box 6.

The mechanism comprises a drum 80 fitted with a spring which constitutes a store of drive energy. The motor and stepdown gear box unit 81 serves to drive the drum so as to store energy in the spring. The drum rotates a shaft 82 which always rotates in the same direction when the spring relaxes. This shaft is associated with coupling devices 83 under electrical or manual control and enabling the usual opening and closing cycles to be performed (e.g. a cycle: open, 0.1 s, close, open). An eccentric 84 serves to transform the one-way rotation of the shaft 82 into back-and-forth circular motion which is communicated to the control shaft 5 of the isolating circuit-breaker. In well known manner, the mechanism includes a manual resetting mechanism including a lever 85 that can be seen in FIGS. 1 and 6.

Figure 8A:
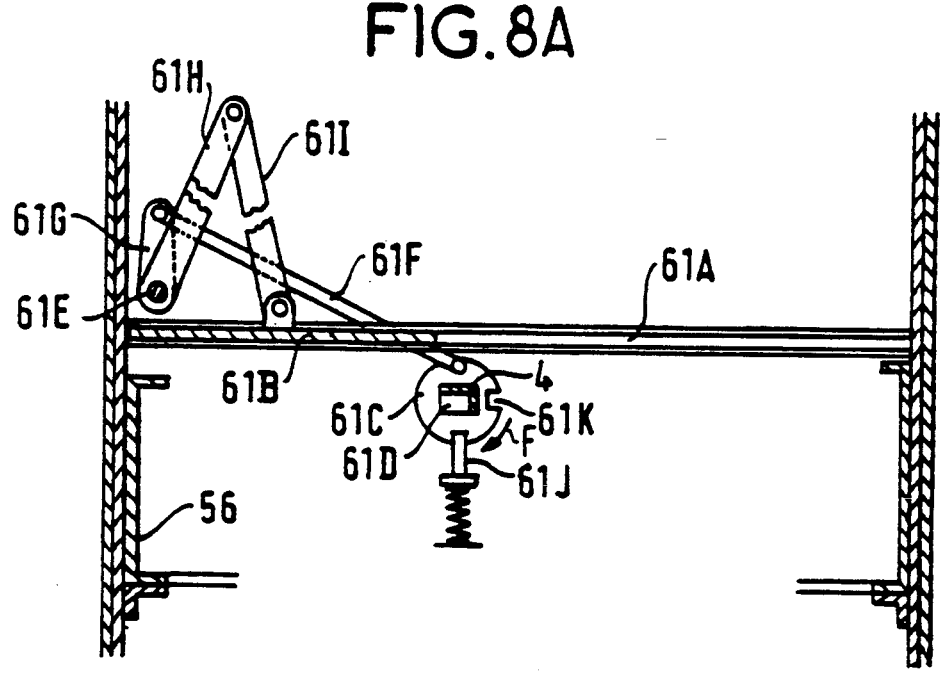
FIG. 8A is a side view of the drive mechanism for the sliding protective drawer.
Figure 8B:
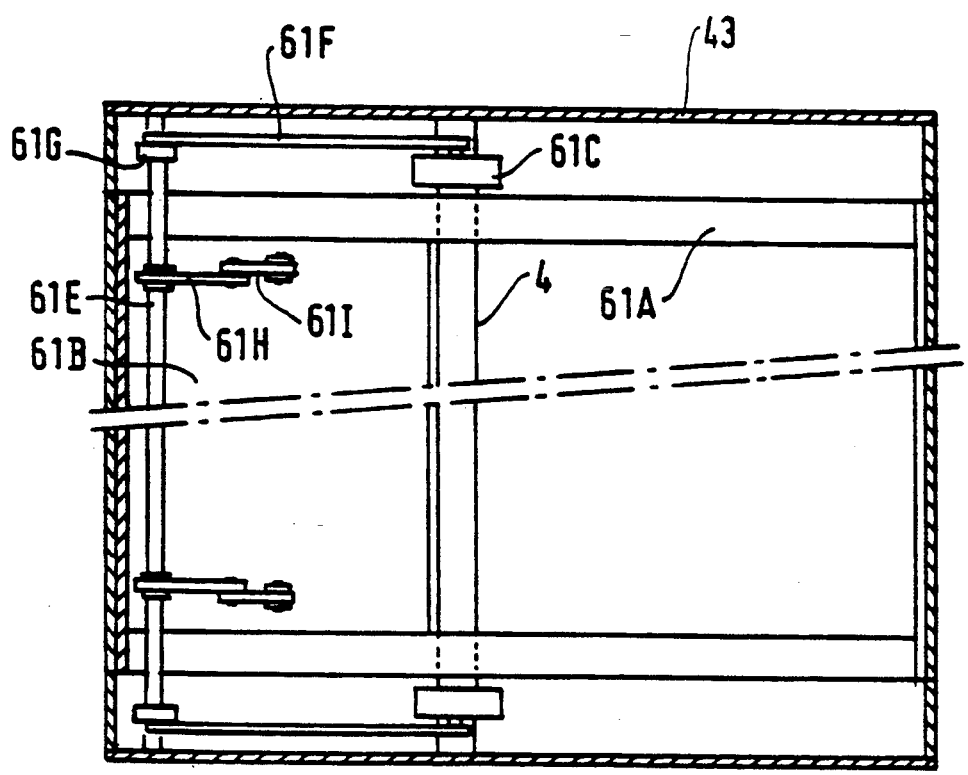
FIG. 8B is a plan view of the same mechanism.

FIGS. 8A and 8B show an embodiment given by way of non-limiting example of a mechanism for driving the flap 61B.

The rear face to the chest 43 carries a moving disk 61C provided with a central hole 61D of appropriate shape for receiving the bar 4 which projects from the drawer beyond the face 45B (FIG. 7), thereby enabling the disk to be rotated when the pole-supporting bar rotates on its own axis during a section switching operation. When the bar is an angle bar as described above, the hole is advantageously square or rectangular in shape. The flap is driven in translation by rotation of the disk by means of two linkages co-operating with a shaft 61E parallel to the plane of the flap and parallel to the bar 4. The shaft is fixed to the chest 47 by means of bearings (not shown). It is rotated by a connecting rod 61F hinged firstly to the disk 61C and secondly to a crank 61G secured to the shaft 61E. Rotation of the shaft is converted into translation which is communicated to the flap by means of two linkages. Only one of the linkages (the one at the back of the drawer) is described in detail since the other linkage is entirely identical. The first linkage comprises a link 61H secured to the shaft 61E and hinged to a crank 61I which is hinged to the flap. During a section switching operation, the support bar 4 engaged in the hole in the disk 61C is rotated in the direction of arrow F. Rotation of the disk 61C rotates the shaft 61E, and the crank shaft and connecting rod assembly 61H-61I causes the flap 61B to move in translation, thereby preventing access to the righthand portion of the busbar compartment. After a section switching operation, if the drawer is pulled out, a locking catch engages in a notch 61K of the disk 61C, thereby holding the flap in position. The catch is provided with a spring and it disengages when the drawer is pushed back in.

In the above figures, it can be seen that the poles of the circuit-breaker are driven by rotating the control shaft 5. FIG. 8C shows a variant embodiment in which the shaft 5 is driven with push-pull translation motion. This motion is communicated to the lever 32 in conventional manner, e.g. by means of a link 32A and a crank 32B. This disposition has the particular advantage of making it equally possible to use a stationary control box 6 without having any technical problems to solve.

A variant embodiment of the flaps for preventing access to the busbar compartment is now described.

FIGS. 8D and 8E show two superposed parallel flaps given respective overall references 61L and 61R. The flap 61L comprises a first portion having three rectangular pieces 61L1, 61L2, and 61L3, each provided with a notch, and connected together by an elongate piece 61M having oblong slots 61N. The flap 61L further comprises a second portion having three pieces 61L1', 61L2', and 61L3', each provided with a notch, and connected together by an elongate piece 61M' provided with studs 61P on either side of said piece and engaging in the slots 61N. The pieces 61L and 61M are urged towards each other by springs such as 61O. The notches define openings that fit round the peripheries of the poles when the poles are in their engaged position, thereby splitting the bay into two portions.

The flap 61R comprises a first portion having three rectangular pieces 61R1, 61R2, and 61R3 connected together by an elongate piece (no reference) and provided with oblong slots, and a second portion having three rectangular pieces 61R1', 61R2', and 61R3' connected together by an elongate piece (no reference) provided with slots in which the studs 61P engage. The two portions are urged towards each other by springs such as 61S.

When the circuit-breaker is in its disengaged and section isolating position, the flap 61R prevents access to the busbar compartment of the bay.

The flaps 61L and 61R are driven either by the poles themselves which carry spurs such as the spur 61T, or else by a mechanism of the type described with reference to FIGS. 8A and 8B.

The isolating circuit-breaker of the invention may be used for building cheap substations that occupy reduced ground area and that include all of the elements necessary for operation.

Figure 9:
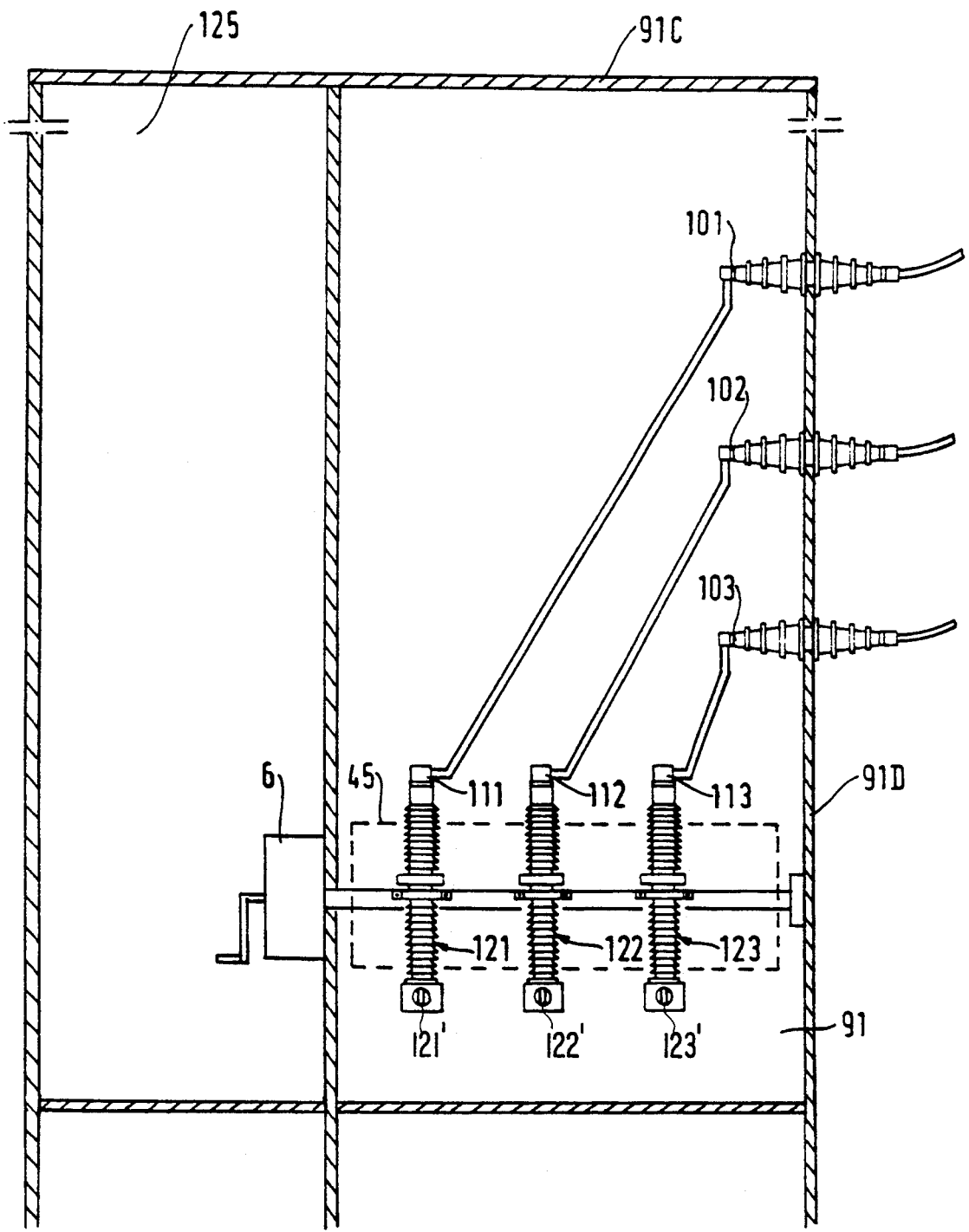
FIG. 9 is a front elevation view in section of a substation including four inlets or outlets and one distribution by means of a set of busbars.
Figure 10:
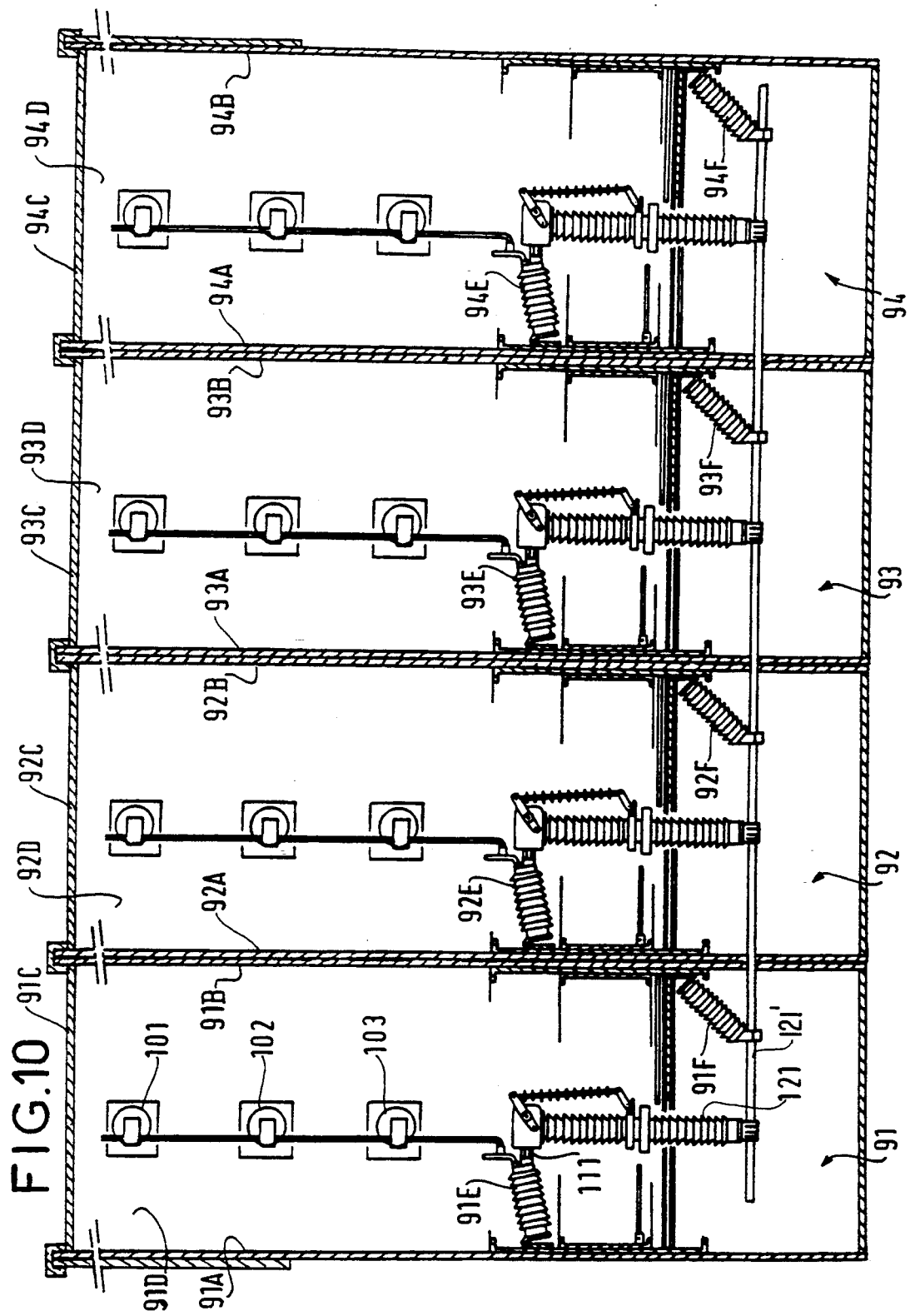
FIG. 10 is an elevation side view in section through the same substation.

FIGS. 9 and 10 show a substation having four inlets or outlets connected by overhead connections to line inlets or transformer outlets, together with distribution using a set of busbars.

FIG. 9 is an elevation view in which the front face has been removed to show the inside of the station.

In this example, the substation comprises four compartments 91 to 94 delimited by respective walls 91A, 91B; 92A, 92B; 93A, 93B; and 94A, 94B. The compartments are placed side by side and they are provided with respective roofs 91C, 92C, 93C, and 94C, and rear faces 91D, 92D, 93D, and 94D.

The walls and the roofs are preferably made of identical panels made of a material selected from concrete, glass fiber reinforced cement (GRC), aluminum, or steel. This rough modular construction is very cheap. It enables electricity substations to be made for use up to 72 kV. The manufacturer of isolating circuit-breakers of the invention can install equipment in such a substation without using the services of an outside firm. This new design of station can constitute the basis of an export policy in which making the panels and the roof can constitute the contribution of a local partner.

As can be seen in bay 91, insulating feedthroughs 101, 102, and 103 are connected to overhead lines via terminals 111, 112, 113 that co-operate with poles 121, 122, 123 of an isolating circuit-breaker of the invention and installed on an angle bar 4 disposed in the drawer 45 and secured to the control box 6. The terminals 111, 112, 113 are held in place by insulators such as 91E, 92E, 93E, and 94E which are fixed to the walls 91A, 92A, 93A, and 94A. The poles of the isolating circuit-breaker co-operate with a set of busbars 121' 122' and 123' which extend over the entire width of the station, passing through the following walls only 91B, 92A, 92B, 93A, 93B, and 94A. This set of busbars is held in place by insulators such as 91F, 92F, 93F, and 94F fixed to the walls 91B, 92B, 93B, and 94B, respectively. These insulators may be current transformers or lightning arrestors.

The walls are of sufficient depth to provide a sheltered operating corridor 125.

The substation described above with reference to FIGS. 9 and 10 provides all functional requirements. The drawers containing the isolating circuit-breakers are inserted directly into the compartments which are easily assembly by means of prefabricated panels, and the feedthroughs, the insulators, and the current transformers or lightning arrestors can be mounted on the panels in a factory.

Insulation between compartments, and between the line side and the busbar side is guaranteed, thereby making any between-phase fault improbable.

A substation of the type described above can be made for any voltage in the range 7.2 kV to 72 kV.

Figure 11:
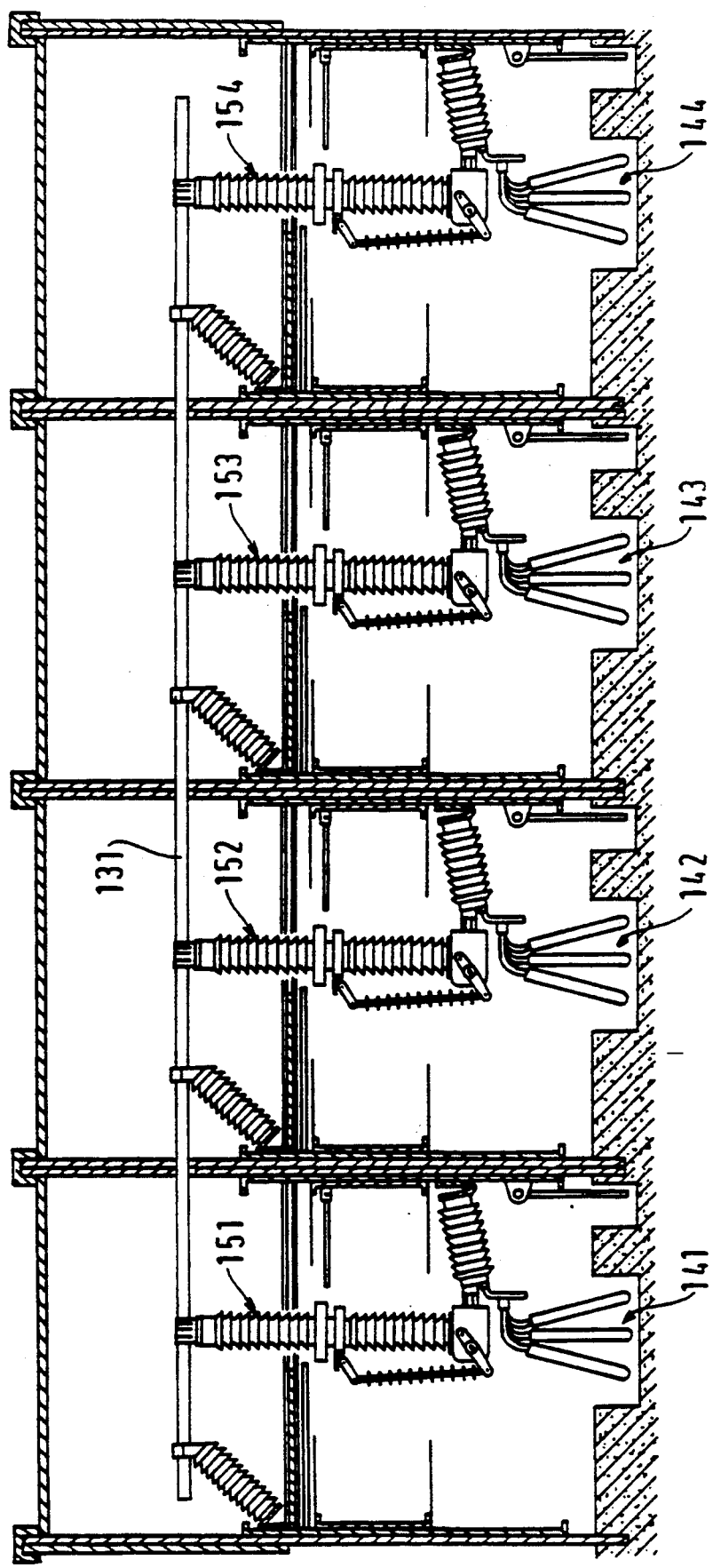
FIG. 11 is an elevation view in section through a substation comprising a set of busbars and a set of underground cable outlets.

FIG. 11 shows a substation entirely similar to the above substation, but in which the inlet is provided by a set of common busbars 131 while the outlet is provided by cables 141, 142, 143, and 144. Each compartment is fitted with an isolating circuit-breaker of the invention 151, 152, 153, and 154.

Figure 12:
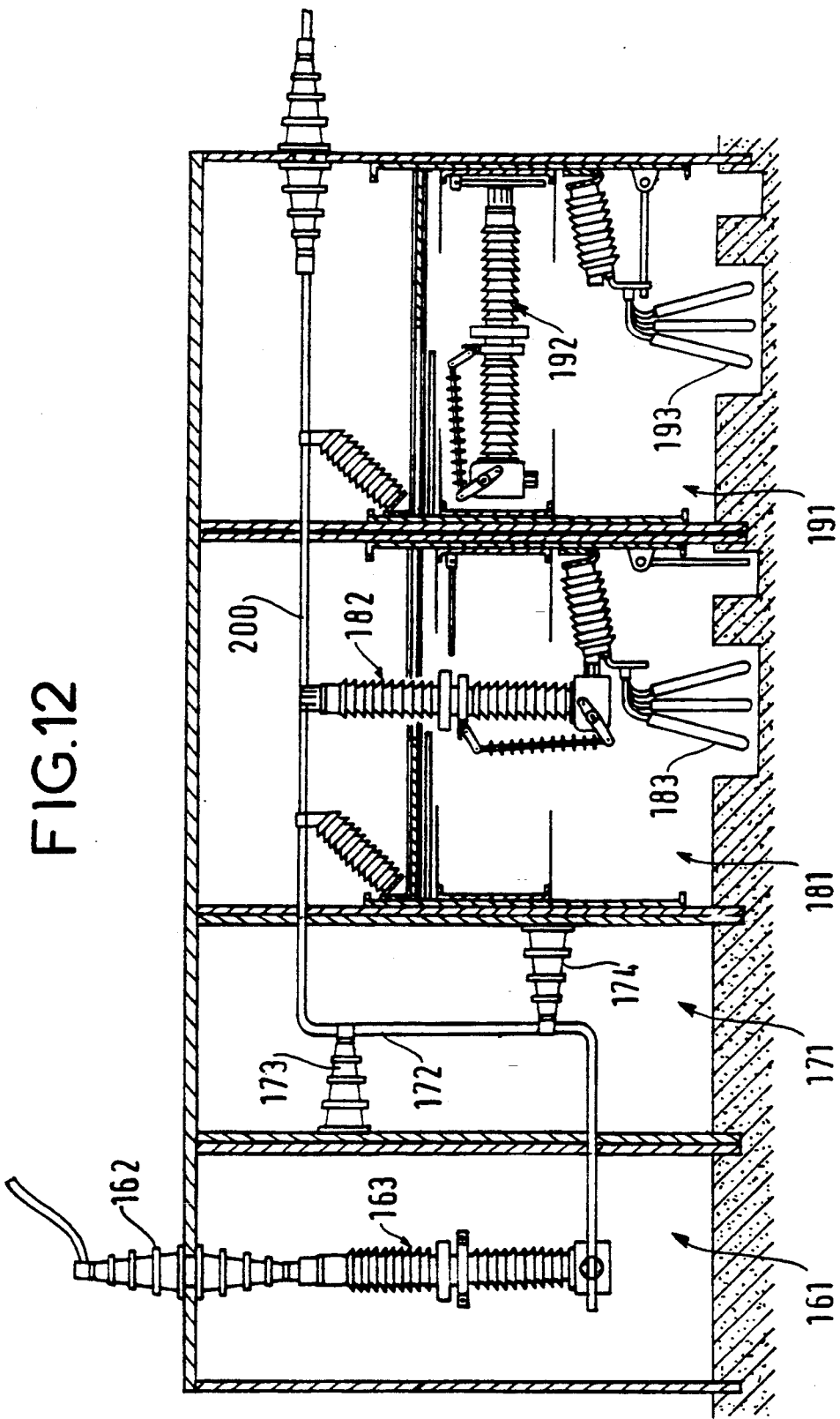
FIG. 12 is an elevation view of another substation having overhead outlets and cable outlets.

FIG. 12 shows a substation having an overhead outlet and two underground outlets by means of cables. The station comprises a first module 161 having a feedthrough 162 in its ceiling and an isolating circuit-breaker 163, the busbars 172 extend upwards in a second module 171 having bar-supporting insulators 173 and 174, a third module 181 includes an isolating circuit-breaker 182 with an outlet 183 for underground cables, and a fourth module 191 includes an isolating circuit-breaker 192 with an outlet 193 for underground cables, the modules 181 and 191 being fed by a common set of busbars 200.

Figure 13:
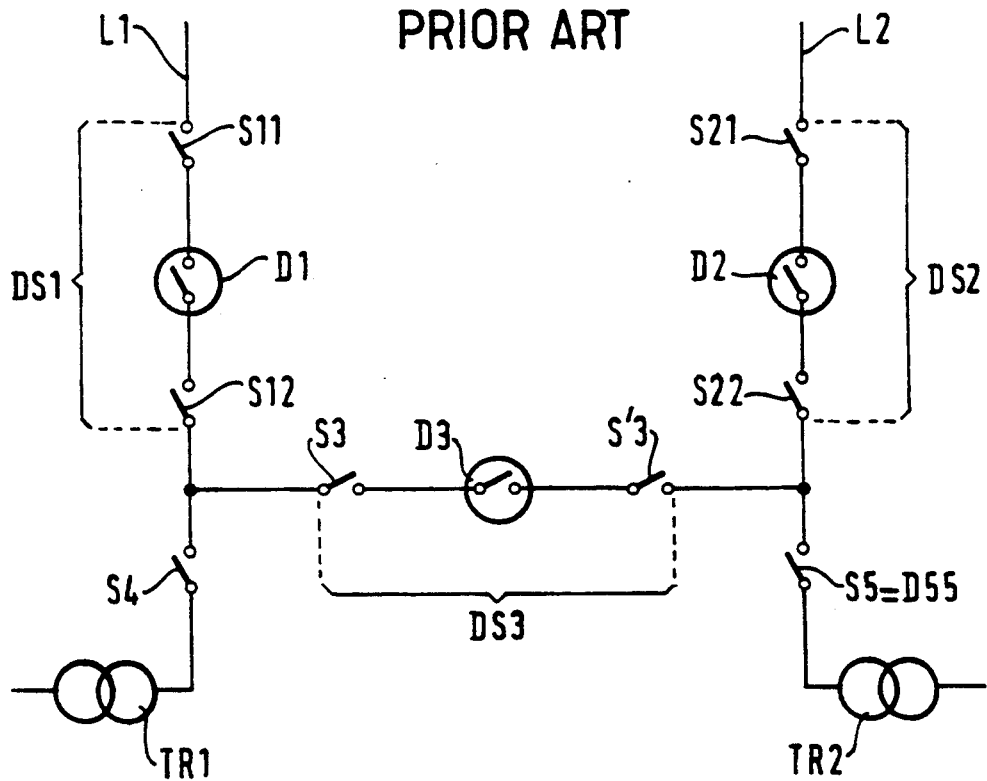
FIG. 13 is a circuit diagram of an H station of conventional type.

FIG. 13 is a circuit diagram of an H station comprising two inlet lines L1 and L2, two transformer outlets TR1 and TR2, and three circuit-breakers D1, D2, and D3 disposed between respective pairs of section switches S11, S12; S21, S22; and S3, S'3. The transformer outlets are protected by respective section switches S4 and S5.

Figure 14:
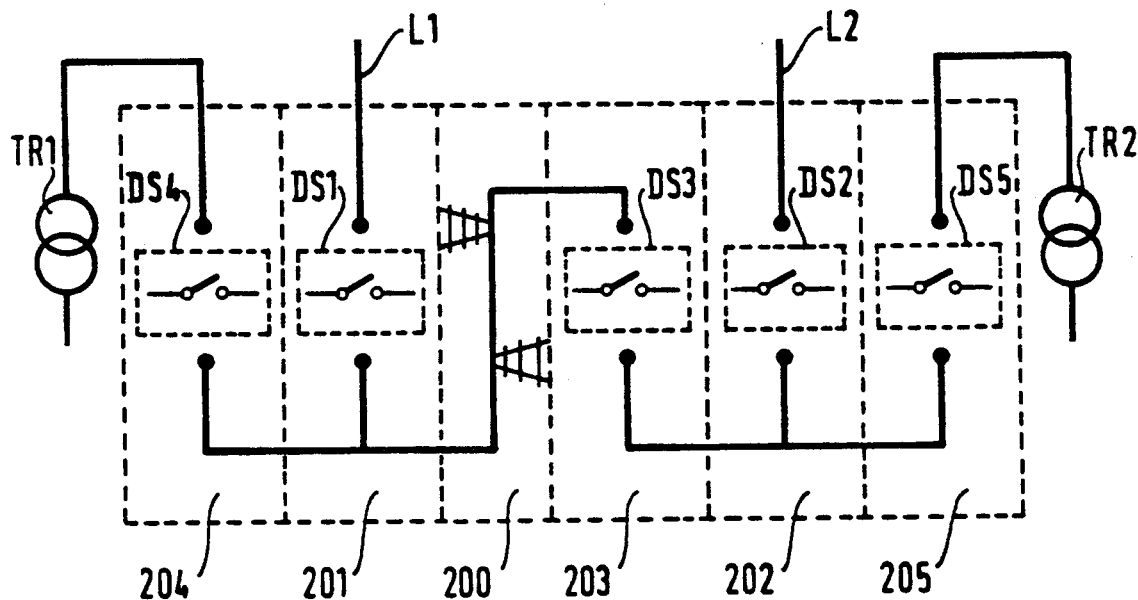
FIG. 14 is a circuit diagram showing an H station made using isolating circuit-breakers of the invention.

Because of the invention, such a station can be made very cheaply using five identical modules 201 to 205 and a module 206 in which the busbars extend upwards (FIG. 14).

The modules 201, 202, and 203 contain isolating circuit breakers of the invention DS1, DS2, and DS3 which replace the following sets of equipment respectively: S11, D1, S12; S21, D2, S22; S3, D3, S'3. The section switches S4 and S5 are replaced by isolating circuit-breakers of the invention DS4 and DS5 in which the current interrupting chambers are omitted and replaced by conductors that provide an internal connection between the end terminals of each pole, i.e. only the section switch function is retained.

Thus, the H station is made in a manner that is particularly cheap using five identical standard bays plus a bay in which the set of busbars extends upwardly, which bay includes no more than a few supporting insulators.

Figure 15:
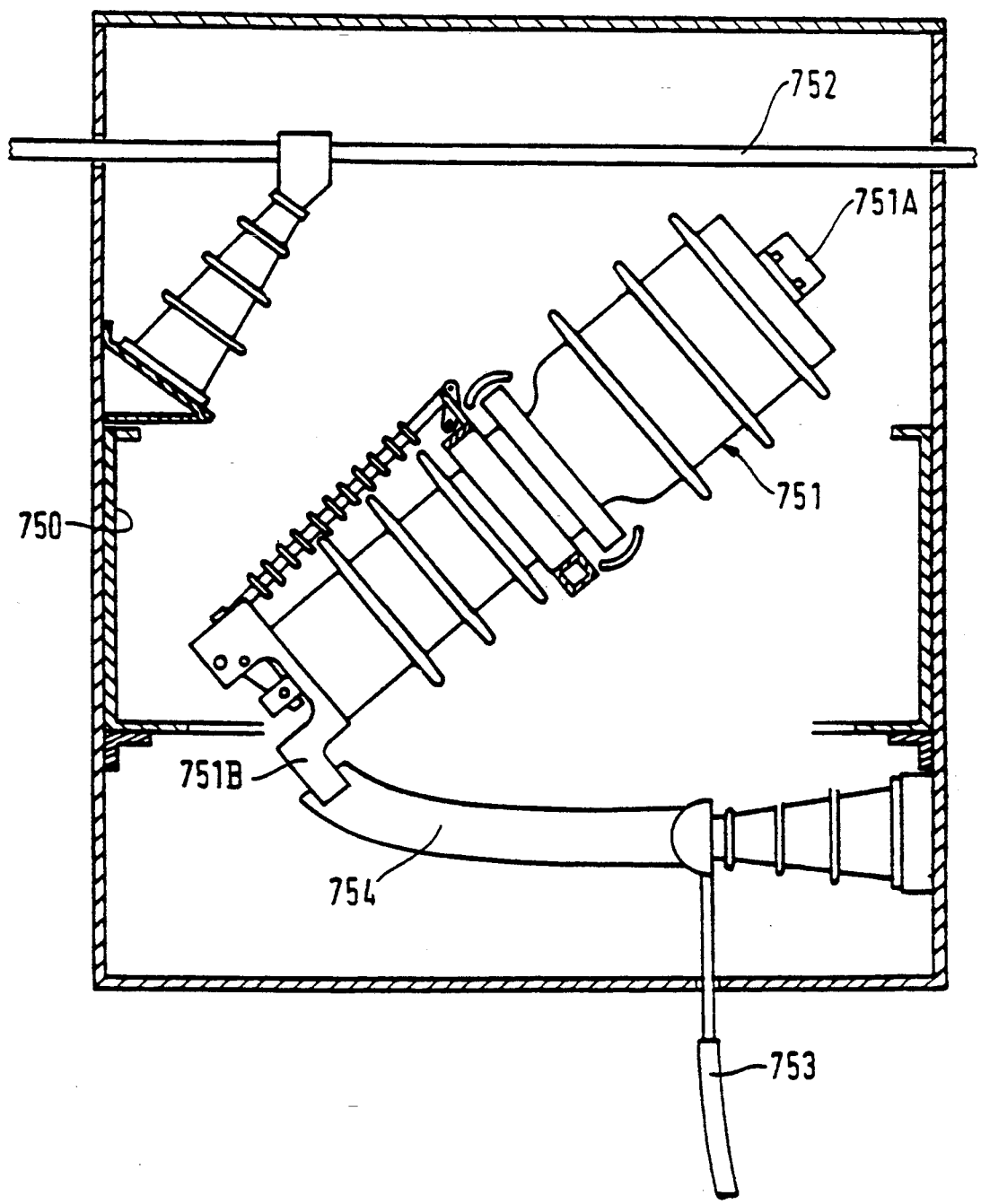
FIG. 15 is a diagram showing a bay organized to enable cables to be integrally grounded.

The isolating circuit-breaker of the invention is particularly suited to making bays enabling a cable to be grounded. Such grounding is required by standards in some countries, and in particular in the United Kingdom where it is known under the English term "integral earthing". FIG. 15 shows a bay enabling such grounding to be performed. It includes a pull-out drawer 750 enclosing the three poles of an isolating circuit-breaker of the invention. Only the pole 751 is visible in the figure since it is an end view. Reference 751A designates the top jaw terminal of the pole, and reference 751B designates its bottom jaw terminal. The bay includes a set of busbars 752 and a cable outlet 753. It may be observed that in comparison with the bay shown in FIGS. 4 and 5, the grounding section switch 57 has been omitted.

Figure 16:
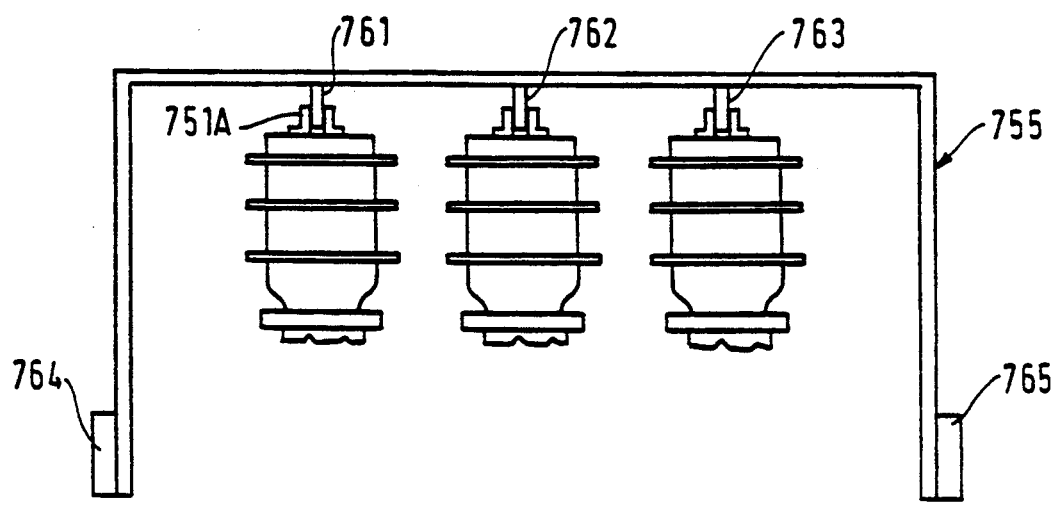
FIG. 16 is a diagram of an accessory used for integral grounding within the bay of FIG. 15.

"Integral earthing" is performed as follows:

the isolating circuit-breaker is put into the disengaged position;

the drawer is pulled out;

the isolating circuit-breaker is tilted through 45° by rotating the pole-supporting bar in a clockwise direction;

the three poles of the circuit-breaker are short circuited by means of a metal bracket 755 (FIG. 16) having three contacts 761, 762, and 763 that engage in the top jaw terminals 751A of the poles. The bracket also serves to ground the poles of the circuit-breakers since the branches of the bracket come into contact with the drawer which is grounded by the metal bar supporting the poles. The bracket also includes abutments 764 and 765 which serve to limit the rotary stroke of the poles in an anticlockwise direction when the poles are tilted back again, and which serves to maintain the poles at a sufficient distance from the busbars 752;

with the drawer still pulled out and the poles still tilting at 45°, a metal extender 754 is fitted onto each of the bottom jaw terminals 751B of the poles;

the isolating circuit-breaker is then returned to the horizontal position and the drawer is closed;

the poles are rotated anticlockwise until they come into abutment, thereby having the effect of putting the extenders 754 into contact with the cable outlets; and the isolating circuit-breaker is closed, thereby grounding the cables through the circuit-breaker.

If tension should be present on a cable at this moment, then the poles of the circuit-breaker open because of the resulting short circuit.

It can thus be seen that a bay fitted with the isolating circuit-breaker of the invention makes it possible to implement "integral earthing" using a few accessories that are simple and completely reliable.

The invention applies to making medium-tension or high tension (up to 72 kV) stations that are novel in design, cheap, and reliable.

If a prior art medium-tension electricity station is considered, it can be observed that regardless of whether installed in the town or in the country such equipment is nearly always installed in a special building. The equipment is made up of prefabricated medium-tension bays each of which constitutes a separate entity with respect to cable inlets and cable outlets, with respect to driving equipment and protection equipment, and with respect to relay equipment.

A station is made up of a set of bays in alignment with the bays being connected to a set of busbars that are common to all of the bays.

It can be said that redundancy exists between the bays and the station since bay volumes ar enclosed within a station volume.

Operators of medium-tension grids have always sought to minimize the consequences within a station of an accident that may occur in a bay. Further efforts are being made in this direction in the content of a European-wide campaign for improving the quality of electricity supply to subscribers:

efforts for conveying faults to ground and for avoiding symmetrical faults between phases that are always the most dangerous and cause the largest amount of damage; and efforts for avoiding arc propagation which could destroy bays other than the bay in which the accident has occurred.

In spite of that, it remains difficult in the event of a fault to direct arcing within metal bays of small size which are in any event filled with insulating materials.

It all countries, operators suffer every year from several medium-tension stations being destroyed by fire, generally due to faults that have continued for a long time because the auxiliary energy source(s) for the protection means have run out while the fault was in progress.

Figure 17:
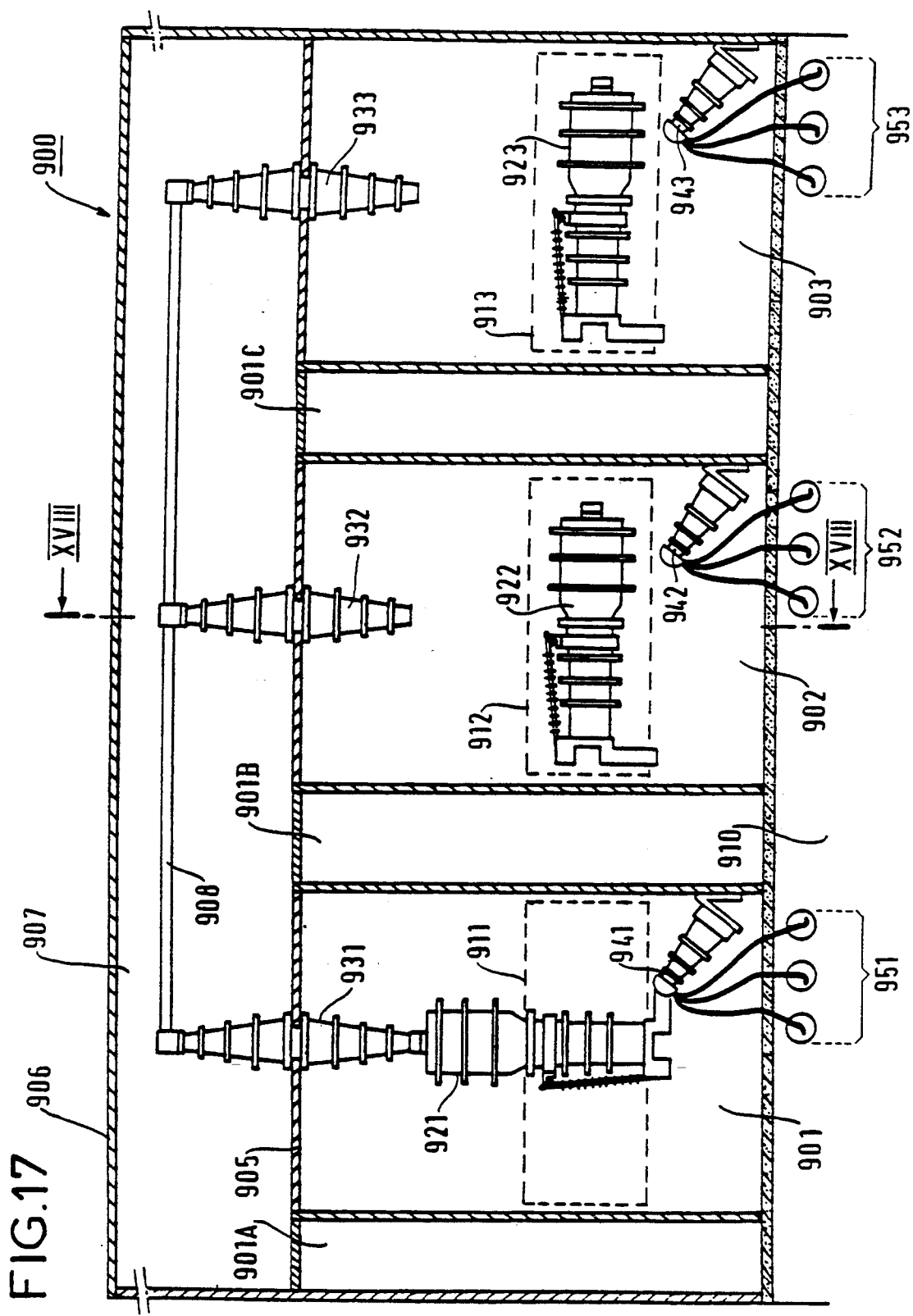
FIG. 17 is a front view in section of a station fitted with isolating circuit-breakers of the invention.
Figure 18:
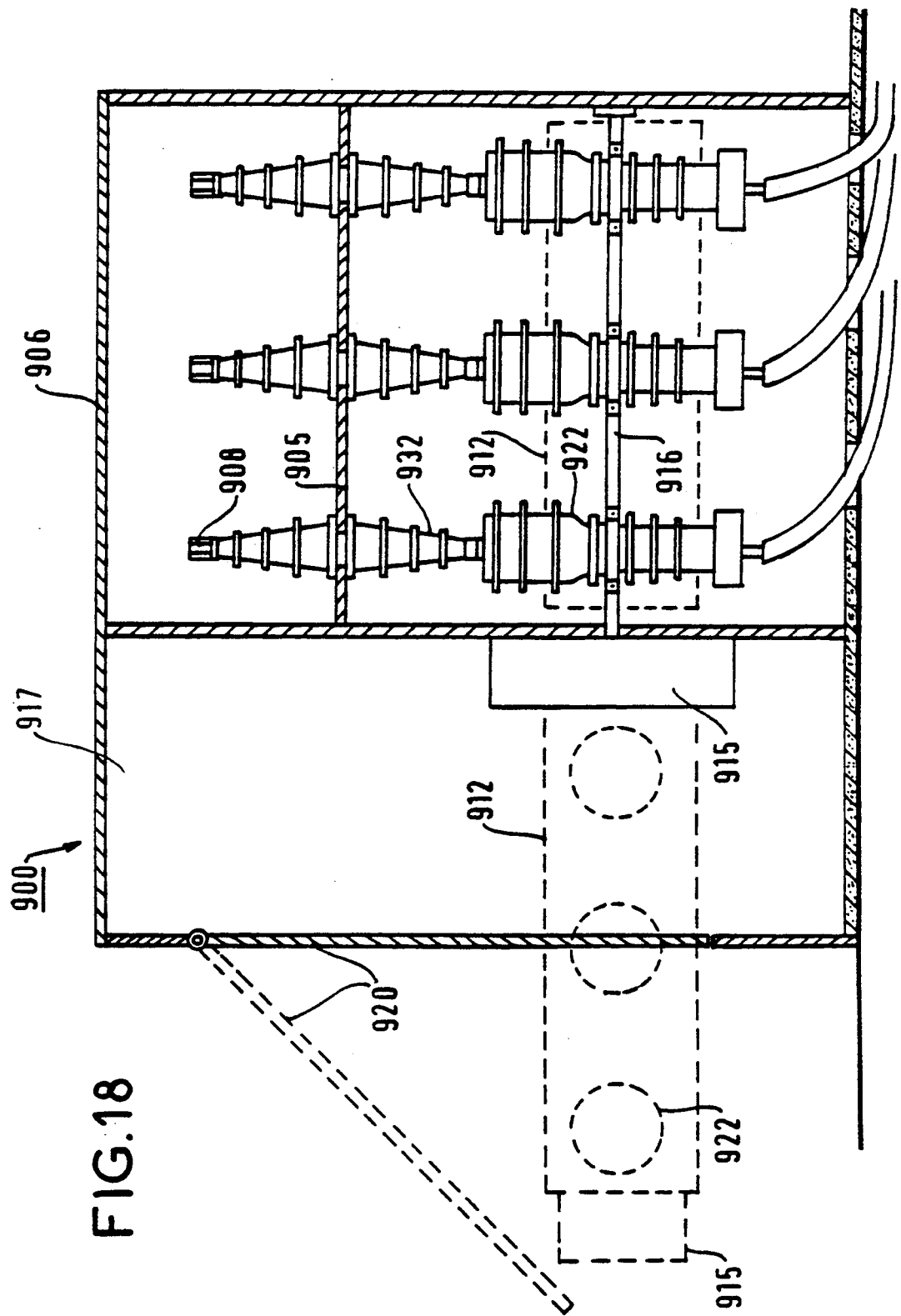
FIG. 18 is a side view in section of the same station.

The isolating circuit-breaker makes it possible to implement a medium-tension station that is simple in structure and cheap, as shown in FIGS. 17 and 18.

In these figures, there can be seen a structure 900 which is generally in the form of a rectangular parallelipiped made of concrete, of glass fiber reinforced cement (GRC), or of equivalent fire-resistant building material, and which includes a plurality of cells 901, 902, and 903, each containing an isolating circuit-breaker of the invention. Each of the cells adjoins a compartment 901A, 901B, or 901C containing protective equipment, preferably mounted on a corresponding sliding drawer and placed in a removable chest (not shown). The compartments and the cells are covered by a ceiling 905 co-operating with a roof 906 to define a compartment 907 containing a set of bus bars common to the compartments.

Each compartment receives a drawer 911, 912 or 913 provided with an isolating circuit-breaker of the above-described type 921, 922, or 923 having a common support bar 916 and a control box 915. These circuit-breakers maybe connected to the set of busbars by insulating feedthroughs 931, 932, 933 and to outlets 941, 942, 943 for cables 951, 952, 953 that leave via cableways formed in the base 910 of the station.

A walkway corridor 917 is provided at the front of the station (FIG. 18) and is closed in normal operation by a flap 920. When action is to be taken on one of the isolating circuit-breakers, e.g. isolating circuit-breaker 922, the flap is raised and the drawer pulled out, as shown by dashed lines in FIG. 18.

The station described above with reference to FIGS. 17 and 18 provides advantages inherent to the use of isolating circuit-breakers of the invention, in addition to the advantages it provides in cheapness of construction. In addition, the design using compartments and cells made of concrete or analogous material ensures that faults between phases have little chance of propagating or of destroying the low voltage equipment required for operating, remote control, or remote signalling purposes.

It may be observed that a drawer containing the poles of an insulating circuit-breaker may be driven manually or under motor control. It is possible to provide a supporting stand on wheels for facilitating the pulling out of a drawer and for supporting a drawer while it is in the open position.

Naturally, the uses to which the invention may be put are numerous and are not limited to the various examples given, with the invention being applicable to all medium-tension installations that use circuit-breakers, section switches, and current measuring devices.

I claim:

1. A multipole sulfur hexafluoride isolating circuit-breaker of any technology in which each pole comprises an insulating case filled with sulfur hexafluoride and provided with first and second metal endplates, the case containing a set of fixed contacts connected to a first jaw terminal outside the case and mechanically and electrically connected to the first endplate, a set of moving contacts electrically connected to a second jaw terminal outside the case, secured to the second endplate, and mechanically connected to a drive mechanism, wherein, for each pole, the moving contacts are electrically connected via sliding contacts to a fixed metal tube extending inside the case and coaxial therewith, the tube opening out inside a sealed casing, said second jaw terminal being secured to the casing, said moving contacts being connected to a drive rod disposed inside said tube and hinged inside the casing to a first end of mechanical transmission means passing through the casing in a sealed manner and having a second end outside the casing hinged to a first end of an insulating rod whose other end is hinged via a crank to a control shaft which is common to the various poles of the isolating circuit-breaker, the control shaft being disposed parallel to a metal bar to ground potential having the poles of the isolating circuit-breaker fixed thereto, the poles being fixed substantially in the middles of their respective cases, the various cases being disposed parallel to each other and perpendicularly to said bar, the ends of said bar being pivotally mounted to two opposite faces of a substantially rectangular drawer, the disconnecting function of the isolating circuit-breaker being provided by rotating said bar through 90° relative to the drawer, the drawer being large enough to contain the set of poles, the control shaft being associated with a control box containing a mechanism for storing drive energy and means for driving said control shaft in rotation or in translation in order to cause all of the poles to perform their circuit-breaker function simultaneously, wherein the circuit-breaker is placed in a metal chest in which the drawer is capable of sliding, said chest carrying a sliding flap that co-operates with a fixed flap to prevent access to a busbar compartment when the drawer is in its open position, and wherein said sliding flap is moved by a disk fixed to the chest and rotated by said bar, the disk rotating a shaft by means of a linkage, said shaft being fixed to at least one connecting rod co-operating with a crank hinged to said sliding flap.

2. An isolating circuit-breaker according to claim 1, wherein the case is surrounded by a wound magnetic torus constituting a current transformer, the torus being disposed above said metal bar.

3. An isolating circuit-breaker according to claim 1, wherein the chest contains insulating elements for holding the sets of busbars and cable outlets with which the isolating circuit-breaker co-operates.

4. An isolating circuit-breaker according to claim 3, wherein the insulating elements are selected from: insulators, current transformers, and lightning arrestors.

5. An insulating circuit-breaker according to claim 1, wherein the fixed flap cooperates with a pivoting shutter fixed to the drawer to separate the busbar compartment from a cable compartment when the isolating circuit-breaker is in operation.

6. A multipole sulfur hexafluoride isolating circuit-breaker of any technology in which each pole comprises an insulating case filled with sulfur hexafluoride and provided with first and second metal endplates, the case containing a set of fixed contacts connected to a first jaw terminal outside the case and mechanically and electrically connected to the first endplate, a set of moving contacts electrically connected to a second jaw terminal outside the case, secured to the second endplate, and mechanically connected to a drive mechanism, wherein, for each pole, the moving contacts are electrically connected via sliding contacts to a fixed metal tube extending inside the case and coaxial therewith, the tube opening out inside a sealed casing, said second jaw terminal being secured to the casing, said moving contacts being connected to a drive rod disposed inside said tube and hinged inside the casing to a first end of mechanical transmission means passing through the casing in a sealed manner and having a second end outside the casing hinged to a first end of an insulating rod whose other end is hinged via a crank to a control shaft which is common to the various poles of the isolating circuit-breaker, the control shaft being disposed parallel to a metal bar to ground potential having the poles of the isolating circuit-breaker fixed thereto, the poles being fixed substantially in the middles of their respective cases, the various cases being disposed parallel to each other and perpendicularly to said bar, the ends of said bar being pivotally mounted to two opposite faces of a substantially rectangular drawer, the disconnecting function of the isolating circuit-breaker being provided by rotating said bar through 90° relative to the drawer, the drawer being large enough to contain the set of poles, the control shaft being associated with a control box containing a mechanism for storing drive energy and means for driving said control shaft in rotation or in translation in order to cause all of the poles to perform their circuit-breaker function simultaneously; further comprising a bay which includes a busbar compartment and a cable compartment, and a chest secured to said bay and for containing said drawer, wherein the chest includes two parallel flaps each respectively comprising two portions capable of moving apart from each other and urged towards each other by springs, one of the flaps separating the busbar compartment from the cable compartment of the bay when the circuit-breaker is disengaged and in its isolating position, while the other flap has openings that provide the same separation while surrounding the poles when the circuit-breaker is in operation.

7. A multipole sulfur hexafluoride isolating circuit-breaker of any technology in which each pole comprises an insulating case filled with sulfur hexafluoride and provided with first and second metal endplates, the case containing a set of fixed contacts connected to a first jaw terminal outside the case and mechanically and electrically connected to the first endplate, a set of moving contacts electrically connected to a second jaw terminal outside the case, secured to the second endplate, and mechanically connected to a drive mechanism, wherein, for each pole, the moving contacts are electrically connected via sliding contacts to a fixed metal tube extending inside the case and coaxial therewith, the tube opening out inside the sealed casing, said second jaw terminal being secured to the casing, said moving contacts being connected to a drive rod disposed inside said tube and hinged inside the casing to a first end of mechanical transmission means passing through the casing in a sealed manner and having a second end outside the casing hinged to a first end of an insulating rod whose other end is hinged via a crank to a control shaft which is common to the various poles of the isolating circuit-breaker, the control shaft being disposed parallel to a metal bar to ground potential having the poles of the isolating circuit-breaker fixed thereto, the poles being fixed substantially in the middles of their respective cases, the various cases being disposed parallel to each other and perpendicularly to said bar, the ends of said bar being pivotally mounted to two opposite faces of a substantially rectangular drawer, the disconnecting function of the isolating circuit-breaker being provided by rotating said bar through 90° relative to the drawer, the drawer being large enough to contain the set of poles, the control shaft being associated with a control box containing a mechanism for storing drive energy and means for driving said control shaft in rotation or in translation in order to cause all of the poles to perform their circuit-breaker function simultaneously, wherein the circuit-breaker is placed in a metal chest in which the drawer is capable of sliding, wherein the chest carries a section switch used for grounding outlet cables that are protected by the isolating circuit-breaker.

8. A multipole sulfur hexafluoride isolating circuit-breaker of any technology in which each pole comprises an insulating case filled with sulfur hexafluoride and provided with first and second metal endplates, the case containing a set of fixed contacts connected to a first saw terminal outside the case and mechanically and electrically connected to the first endplate, a set of moving contacts electrically connected to a second jaw terminal outside the case, secured to the second endplate, and mechanically connected to a drive mechanism, wherein, for each pole, the moving contacts are electrically connected via sliding contacts to a fixed metal tube extending inside the case and coaxial therewith, the tube opening out inside a sealed casing, said second jaw terminal being secured to the casing, said moving contacts being connected to a drive rod disposed inside said tube and hinged inside the casing to a first end of mechanical transmission means passing through the casing in a sealed manner and having a second end outside the casing hinged to a first end of an insulating rod whose other end is hinged via a crank to a control shaft which is common to the various poles of the isolating circuit-breaker, the control shaft being disposed parallel to a metal bar to ground potential having the poles of the isolating circuit-breaker fixed thereto, the poles being fixed substantially in the middles of their respective cases, the various cases being disposed parallel to each other and perpendicularly to said bar, the ends of said bar being pivotally mounted to two opposite faces of a substantially rectangular drawer, the disconnecting function of the isolating circuit-breaker being provided by rotating said bar through 90° relative to the drawer, the drawer being large enough to contain the set of poles, the control shaft being associated with a control box containing a mechanism for storing drive energy and means for driving said control shaft in rotation or in translation in order to cause all of the poles to perform their circuit-breaker function simultaneously, wherein the circuit-breaker is placed in a metal chest in which the drawer is capable of sliding, and wherein the circuit-breaker is disposed between a set of busbars and cable outlets, the circuit-breaker being arranged so that cables can be grounded integrally via the circuit-breaker by means of a bracket short circuiting top terminals of the circuit-breaker and grounding them by putting them into contact with the drawer, and by means of extender conductors providing contact between bottom terminals of the isolating circuit-breaker and the cable outlets.

9. An isolating circuit-breaker according to claim 8, wherein the bracket includes electrical and mechanical abutments for limiting the rotary stroke inside the drawer.

* * * * *